US010764705B2

(12) United States Patent
Laaksonen et al.

(10) Patent No.: US 10,764,705 B2
(45) Date of Patent: Sep. 1, 2020

(54) PERCEPTION OF SOUND OBJECTS IN MEDIATED REALITY

(71) Applicant: Nokia Technologies Oy, Espoo (FI)

(72) Inventors: Lasse Laaksonen, Tampere (FI); Miikka Vilermo, Siuro (FI); Mikko Tammi, Tampere (FI); Arto Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/308,519

(22) PCT Filed: Jun. 2, 2017

(86) PCT No.: PCT/FI2017/050413
§ 371 (c)(1),
(2) Date: Dec. 10, 2018

(87) PCT Pub. No.: WO2017/220852
PCT Pub. Date: Dec. 28, 2017

(65) Prior Publication Data
US 2019/0166448 A1 May 30, 2019

(30) Foreign Application Priority Data
Jun. 21, 2016 (EP) ..................................... 16175574

(51) Int. Cl.
*H04S 7/00* (2006.01)
*G06F 3/01* (2006.01)
(Continued)

(52) U.S. Cl.
CPC .............. *H04S 7/303* (2013.01); *G06F 3/011* (2013.01); *G06F 3/013* (2013.01); *G06F 3/017* (2013.01);
(Continued)

(58) Field of Classification Search
CPC ...... G06F 3/011; G06F 3/04815; G06F 3/013; G06F 3/017; G06F 3/167; G06F 1/163;
(Continued)

(56) References Cited

U.S. PATENT DOCUMENTS 6,011,851 A    1/2000  Connor et al.
8,520,872 B2 * 8/2013  Jang .................... H04S 7/302
                                                 381/310
(Continued)

FOREIGN PATENT DOCUMENTS

CN    101843114 A    9/2010
CN    103516895 A    1/2014
(Continued)

OTHER PUBLICATIONS

"Google Patents 'pay-per-gaze' Eye-Tracking That Could Measure Emotional Response to Real-World Ads", The Verge, Retrieved on Dec. 6, 2018, Webpage available at : https://www.theverge.com/2013/8/18/4633558/google-patents-pay-per-gaze-eye-tracking-ads.
(Continued)

*Primary Examiner* — Lun-See Lao
(74) *Attorney, Agent, or Firm* — Harrington & Smith

(57) ABSTRACT

A method comprising: causing classification of sound objects, within a rendered virtual space, as a first class of sound object or a second class of sound object in dependence upon historic action of a user within the virtual space; rendering one or more sound objects of the first class according to at least first rules; and rendering one or more sound objects of the second class according to at least second rules, different to the first rules, and a current position of the user within the virtual space.

19 Claims, 9 Drawing Sheets

(51) Int. Cl.
*G06F 3/0481* (2013.01)
*G06F 3/16* (2006.01)

(52) U.S. Cl.
CPC .......... *G06F 3/04815* (2013.01); *G06F 3/167* (2013.01); *H04S 7/302* (2013.01); *H04S 7/307* (2013.01); *H04S 2400/11* (2013.01); *H04S 2400/13* (2013.01)

(58) Field of Classification Search
CPC ........ G06F 3/012; G06F 3/0304; G06F 3/038; G06F 3/04842; H04S 7/303; H04S 2400/11; H04S 7/302; H04S 7/307; H04S 2400/13; H04S 3/008; H04S 7/30; H04R 1/406; H04R 2499/13; H04R 3/005; H04R 5/02; H04R 5/04
USPC .............................................. 381/300, 17–23
See application file for complete search history.

(56) References Cited

U.S. PATENT DOCUMENTS

| | | | | |
|---|---|---|---|---|
| 8,854,447 | B2* | 10/2014 | Conness | H04N 5/60 345/156 |
| 9,343,053 | B2* | 5/2016 | Harel | G10H 1/368 |
| 2009/0310802 | A1* | 12/2009 | Zhang | H04S 7/302 381/300 |
| 2010/0040238 | A1* | 2/2010 | Jang | H04S 7/302 381/17 |
| 2011/0051940 | A1* | 3/2011 | Ishikawa | H04L 12/40013 381/22 |
| 2013/0156201 | A1 | 6/2013 | Nakai | 381/17 |
| 2015/0055808 | A1 | 2/2015 | Vennstrom et al. | |
| 2015/0195641 | A1 | 7/2015 | Di Censo et al. | |
| 2016/0147492 | A1 | 5/2016 | Fugate et al. | |

FOREIGN PATENT DOCUMENTS

| | | |
|---|---|---|
| CN | 104487915 A | 4/2015 |
| CN | 105073073 A | 11/2015 |
| CN | 105487657 A | 4/2016 |
| EP | 2413615 A2 | 2/2012 |
| JP | H09-090963 | 4/1997 |
| KR | 2010/0021387 A | 2/2010 |
| WO | 2009/056956 A1 | 5/2009 |
| WO | WO-2010/109918 A1 | 9/2012 |
| WO | WO2012120810 A1 | 7/2014 |

OTHER PUBLICATIONS

Extended European Search Report received for corresponding European Patent Application No. 16175574.9, dated Dec. 23, 2016, 13 pages.

Martinson et al., "Improving Human-Robot Interaction Through Adaptation to the Auditory Scene", 2nd ACM/IEEE International Conference on Human-Robot Interaction (HRI), Mar. 8-11, 2007, pp. 113-120.

International Search Report and Written Opinion received for corresponding Patent Cooperation Treaty Application No. PCT/FI2017/050413, dated Sep. 7, 2017, 15 pages.

Office action received for corresponding European Patent Application No. 16175574.9, dated Dec. 18, 2018, 8 pages.

* cited by examiner

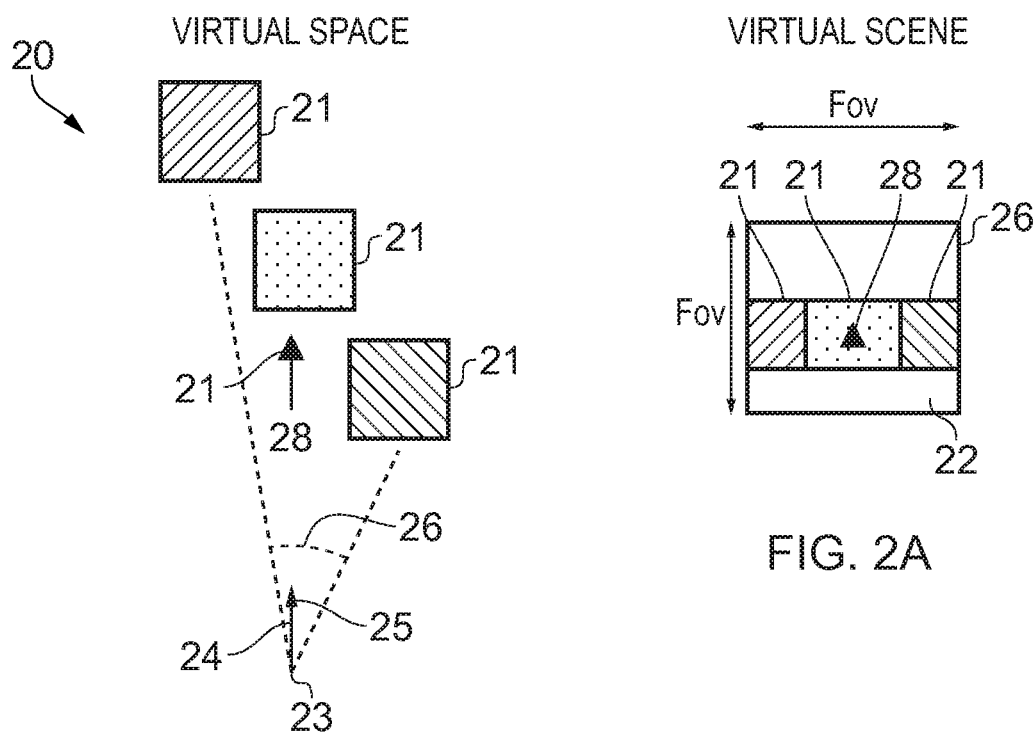
FIG. 1A
FIG. 2A
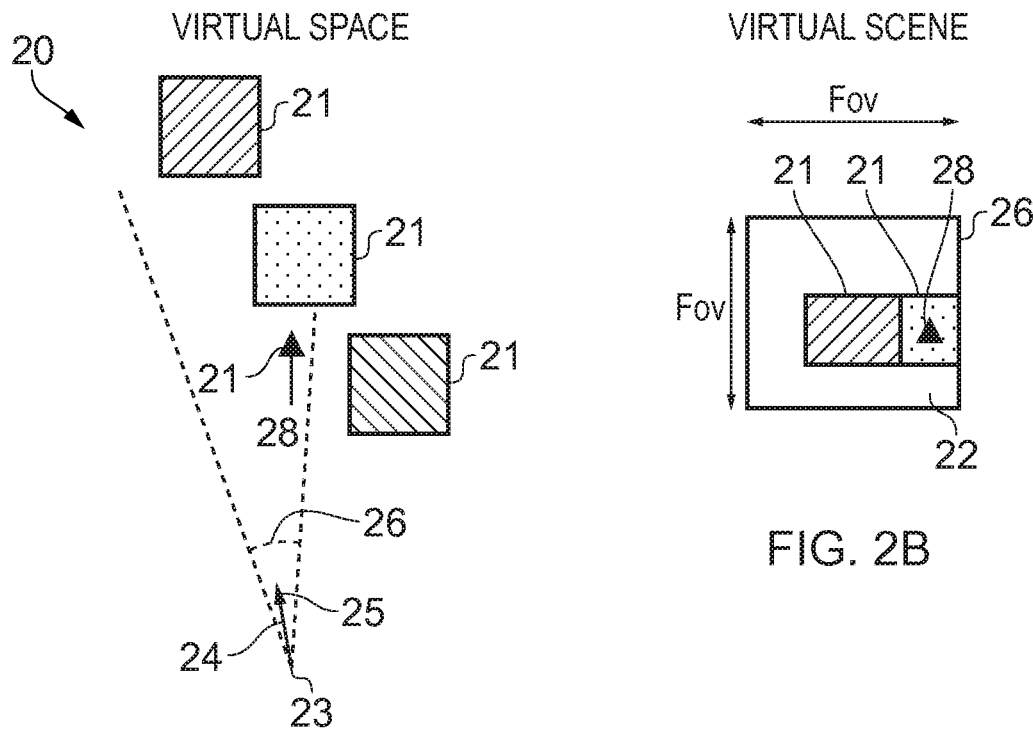
FIG. 1B
FIG. 2B

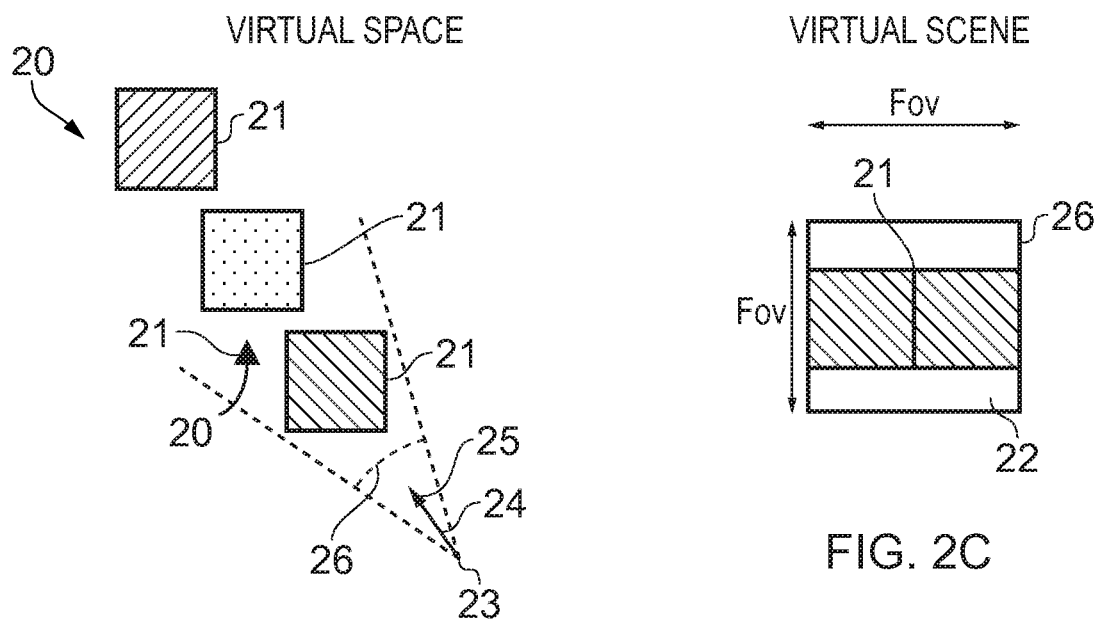
FIG. 1C
FIG. 2C
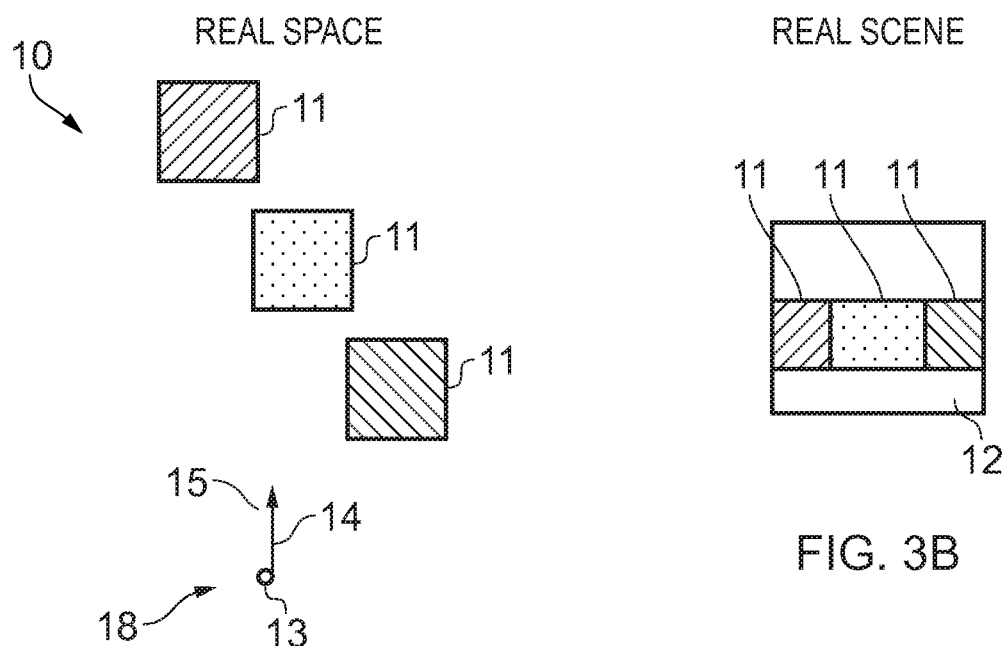
FIG. 3A
FIG. 3B

PERCEPTION OF SOUND OBJECTS IN MEDIATED REALITY

RELATED APPLICATION

This application was originally filed as Patent Cooperation Treaty Application No. PCT/FI2017/050413 filed Jun. 2, 2017 which claims priority benefit to EP Patent Application No. 16175574.9, filed Jun. 21, 2016.

TECHNOLOGICAL FIELD

Embodiments of the present invention relate to mediated reality for example augmented reality or virtual reality.

BACKGROUND

Mediated reality in this document refers to a user experiencing a fully or partially artificial environment.

Augmented reality is a form of mediated reality in which a user experiences a partially artificial, partially real environment. Virtual reality is a form of mediated reality in which a user experiences a fully artificial environment.

BRIEF SUMMARY

According to various, but not necessarily all, embodiments of the invention there is provided a method comprising: causing classification of sound objects, within a rendered virtual space, as a first class of sound object or a second class of sound object in dependence upon historic action of a user within the virtual space;
rendering one or more sound objects of the first class according to at least first rules; and
rendering one or more sound objects of the second class according to at least second rules, different to the first rules, and a current position of the user within the virtual space.

According to various, but not necessarily all, embodiments of the invention there is provided examples as claimed in the appended claims.

BRIEF DESCRIPTION

For a better understanding of various examples that are useful for understanding the brief description, reference will now be made by way of example only to the accompanying drawings in which:

FIGS. 1A-1C and 2A-2C illustrate examples of mediated reality in which

FIGS. 1A, 1B, 1C illustrate the same virtual visual space and different points of view and FIGS. 2A, 2B, 2C illustrate a virtual visual scene from the perspective of the respective points of view;

FIG. 3A illustrates an example of a real space and FIG. 3B illustrates an example of a real visual scene that partially corresponds with the virtual visual scene of FIG. 1B;

DEFINITIONS

Figure 4:
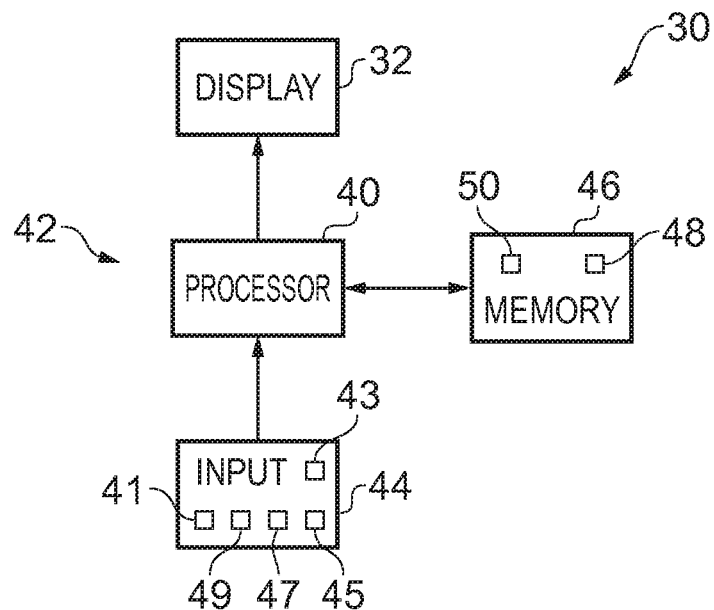
FIG. 4 illustrates an example of an apparatus that is operable to enable mediated reality and/or augmented reality and/or virtual reality.

"virtual visual space" refers to fully or partially artificial environment that may be viewed, which may be three dimensional.

"virtual visual scene" refers to a representation of the virtual visual space viewed from a particular point of view within the virtual visual space.

"real space" refers to a real environment, which may be three dimensional.

"real visual scene" refers to a representation of the real space viewed from a particular point of view within the real space.

"mediated reality" in this document refers to a user visually experiencing a fully or partially artificial environment (a virtual visual space) as a virtual visual scene at least partially displayed by an apparatus to a user. The virtual visual scene is determined by a point of view within the virtual visual space and a field of view. Displaying the virtual visual scene means providing it in a form that can be seen by the user.

"augmented reality" in this document refers to a form of mediated reality in which a user visually experiences a partially artificial environment (a virtual visual space) as a virtual visual scene comprising a real visual scene of a physical real world environment (real space) supplemented by one or more visual elements displayed by an apparatus to a user;

"virtual reality" in this document refers to a form of mediated reality in which a user visually experiences a fully artificial environment (a virtual visual space) as a virtual visual scene displayed by an apparatus to a user;

"perspective-mediated" as applied to mediated reality, augmented reality or virtual reality means that user actions determine the point of view within the virtual visual space, changing the virtual visual scene;

"first person perspective-mediated" as applied to mediated reality, augmented reality or virtual reality means perspective mediated with the additional constraint that the user's real point of view determines the point of view within the virtual visual space;

"third person perspective-mediated" as applied to mediated reality, augmented reality or virtual reality means perspective mediated with the additional constraint that the user's real point of view does not determine the point of view within the virtual visual space;

"user interactive-mediated" as applied to mediated reality, augmented reality or virtual reality means that user actions at least partially determine what happens within the virtual visual space;

"displaying" means providing in a form that is perceived visually (viewed) by the user.

"rendering" means providing in a form that is perceived by the user

"sound space" refers to an arrangement of sound sources in a three-dimensional space. A sound space may be defined in relation to recording sounds (a recorded sound space) and in relation to rendering sounds (a rendered sound space).

"sound scene" refers to a representation of the sound space listened to from a particular point of view within the sound space.

"sound object" refers to sound that may be located within the sound space. A source sound object represents a sound source within the sound space. A recorded sound object represents sounds recorded at a particular microphone.

"Correspondence" or "corresponding" when used in relation to a sound space and a virtual visual space means that the sound space and virtual visual space are time and space aligned, that is they are the same space at the same time.

"Correspondence" or "corresponding" when used in relation to a sound scene and a virtual visual scene means that the sound space and virtual visual space are corresponding and a notional listener whose point of view defines the sound scene and a notional viewer whose point of view defines the virtual visual scene are at the same position and orientation, that is they have the same point of view.

"virtual space" may mean a virtual visual space, mean a sound space or mean a combination of a virtual visual space and corresponding sound space.

DESCRIPTION

Simple modeling of real-world sound transport from a point source without any reflections or reverberations would imply that the sound power is distributed over the surface of a sphere and that intensity of sound (power per unit area) is attenuated according to an inverse square law. There is therefore a rapid decrease in power with distance from the sound source.

The perception of loudness of a sound by a human is dependent upon not only the sound intensity but also the ear's response to sound intensity which has a non-linear dependence upon intensity and frequency.

The human ear typically has increased sensitivity to sound, at all intensities, in the frequency range 2 kHz to 5 kHz.

The human ear also demonstrates saturation effects. Sounds in the same one of the multiple critical frequency bands compete for the same nerve endings on the basilar membrane of the inner ear which show saturation effects.

In the real world (or virtual world), when a person is in a crowded room of people talking, it can be difficult to listen to different sound sources (sound objects) even when the listener is very close to those sound sources (sound objects).

At least some embodiments described below, enhance a user's ability to listen to particular sound objects in a virtual space. The virtual world is not necessarily constrained by physics or human physiology, and it is possible to provide a user with 'super-human' hearing.

This may be achieved, for example, by classifying sound objects, within a rendered virtual space, as a first class of sound object or a second class of sound object in dependence upon historic action of a user within the virtual space; then rendering one or more sound objects of the first class according to at least first rules and rendering one or more sound objects of the second class according to at least second rules, different to the first rules, and a current position of the user within the virtual space.

FIGS. 1A-1C and 2A-2C illustrate examples of mediated reality. The mediated reality may be augmented reality or virtual reality.

FIGS. 1A, 1B, 1C illustrate the same virtual visual space 20 comprising the same virtual objects 21, however, each Fig illustrates a different point of view 24. The position and direction of a point of view 24 can change independently. The direction but not the position of the point of view 24 changes from FIG. 1A to FIG. 1B. The direction and the position of the point of view 24 changes from FIG. 1B to FIG. 1C.

FIGS. 2A, 2B, 2C illustrate a virtual visual scene 22 from the perspective of the different points of view 24 of respective FIGS. 1A, 1B, 1C. The virtual visual scene 22 is determined by the point of view 24 within the virtual visual space 20 and a field of view 26. The virtual visual scene 22 is at least partially displayed to a user.

The virtual visual scenes 22 illustrated may be mediated reality scenes, virtual reality scenes or augmented reality scenes. A virtual reality scene displays a fully artificial virtual visual space 20. An augmented reality scene displays a partially artificial, partially real virtual visual space 20.

The mediated reality, augmented reality or virtual reality may be user interactive-mediated. In this case, user actions at least partially determine what happens within the virtual visual space 20. This may enable interaction with a virtual object 21 such as a visual element 28 within the virtual visual space 20.

The mediated reality, augmented reality or virtual reality may be perspective-mediated. In this case, user actions determine the point of view 24 within the virtual visual space 20, changing the virtual visual scene 22. For example, as illustrated in FIGS. 1A, 1B, 1C a position 23 of the point of view 24 within the virtual visual space 20 may be changed and/or a direction or orientation 25 of the point of view 24 within the virtual visual space 20 may be changed. If the virtual visual space 20 is three-dimensional, the position 23 of the point of view 24 has three degrees of freedom e.g. up/down, forward/back, left/right and the direction 25 of the point of view 24 within the virtual visual space 20 has three degrees of freedom e.g. roll, pitch, yaw. The point of view 24 may be continuously variable in position 23 and/or direction 25 and user action then changes the position and/or direction of the point of view 24 continuously. Alternatively, the point of view 24 may have discrete quantised positions 23 and/or discrete quantised directions 25 and user action switches by discretely jumping between the allowed positions 23 and/or directions 25 of the point of view 24.

FIG. 3A illustrates a real space 10 comprising real objects 11 that partially corresponds with the virtual visual space 20 of FIG. 1A. In this example, each real object 11 in the real space 10 has a corresponding virtual object 21 in the virtual visual space 20, however, each virtual object 21 in the virtual visual space 20 does not have a corresponding real object 11 in the real space 10. In this example, one of the virtual objects 21, the computer-generated visual element 28, is an artificial virtual object 21 that does not have a corresponding real object 11 in the real space 10.

A linear mapping exists between the real space 10 and the virtual visual space 20 and the same mapping exists between each real object 11 in the real space 10 and its corresponding virtual object 21. The relative relationship of the real objects 11 in the real space 10 is therefore the same as the relative relationship between the corresponding virtual objects 21 in the virtual visual space 20.

FIG. 3B illustrates a real visual scene 12 that partially corresponds with the virtual visual scene 22 of FIG. 1B, it includes real objects 11 but not artificial virtual objects. The real visual scene is from a perspective corresponding to the point of view 24 in the virtual visual space 20 of FIG. 1A. The real visual scene 12 content is determined by that corresponding point of view 24 and the field of view 26.

FIG. 2A may be an illustration of an augmented reality version of the real visual scene 12 illustrated in FIG. 3B. The virtual visual scene 22 comprises the real visual scene 12 of the real space 10 supplemented by one or more visual elements 28 displayed by an apparatus to a user. The visual elements 28 may be a computer-generated visual element. In a see-through arrangement, the virtual visual scene 22 comprises the actual real visual scene 12 which is seen through a display of the supplemental visual element(s) 28. In a see-video arrangement, the virtual visual scene 22 comprises a displayed real visual scene 12 and displayed supplemental visual element(s) 28. The displayed real visual scene 12 may be based on an image from a single point of view 24 or on multiple images from different points of view 24 at the same time, processed to generate an image from a single point of view 24.

FIG. 4 illustrates an example of an apparatus 30 that is operable to enable mediated reality and/or augmented reality and/or virtual reality.

The apparatus 30 comprises a display 32 for providing at least parts of the virtual visual scene 22 to a user in a form that is perceived visually by the user. The display 32 may be a visual display that provides light that displays at least parts of the virtual visual scene 22 to a user. Examples of visual displays include liquid crystal displays, organic light emitting displays, emissive, reflective, transmissive and transflective displays, direct retina projection display, near eye displays etc.

The display 32 is controlled in this example but not necessarily all examples by a controller 42.

Implementation of a controller 42 may be as controller circuitry. The controller 42 may be implemented in hardware alone, have certain aspects in software including firmware alone or can be a combination of hardware and software (including firmware).

As illustrated in FIG. 4 the controller 42 may be implemented using instructions that enable hardware functionality, for example, by using executable computer program instructions 48 in a general-purpose or special-purpose processor 40 that may be stored on a computer readable storage medium (disk, memory etc) to be executed by such a processor 40.

The processor 40 is configured to read from and write to the memory 46. The processor 40 may also comprise an output interface via which data and/or commands are output by the processor 40 and an input interface via which data and/or commands are input to the processor 40.

The memory 46 stores a computer program 48 comprising computer program instructions (computer program code) that controls the operation of the apparatus 30 when loaded into the processor 40. The computer program instructions, of the computer program 48, provide the logic and routines that enables the apparatus to perform the methods illustrated in FIGS. 5A & 5B. The processor 40 by reading the memory 46 is able to load and execute the computer program 48.

Figure 5A:
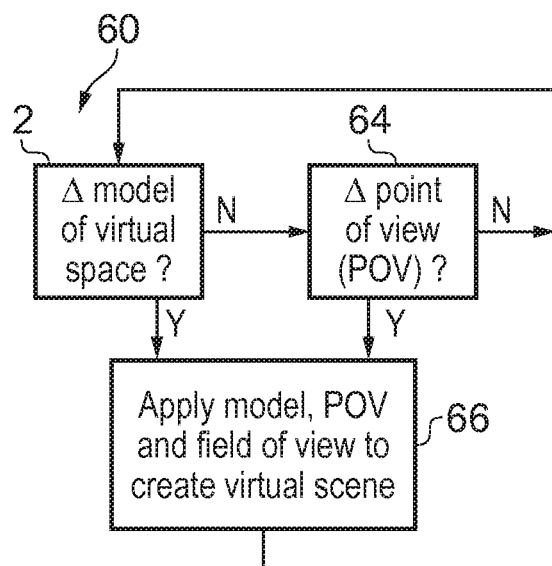
FIG. 5A illustrates an example of a method for enabling mediated reality and/or augmented reality and/or virtual reality.
Figure 5B:
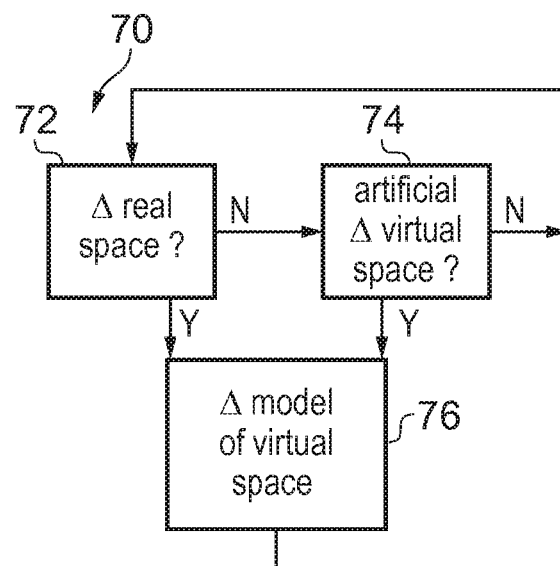
FIG. 5B illustrates an example of a method for updating a model of the virtual visual space for augmented reality.

The blocks illustrated in the FIGS. 5A & 5B may represent steps in a method and/or sections of code in the computer program 48. The illustration of a particular order to the blocks does not necessarily imply that there is a required or preferred order for the blocks and the order and arrangement of the block may be varied. Furthermore, it may be possible for some blocks to be omitted.

The apparatus 30 may enable mediated reality and/or augmented reality and/or virtual reality, for example using the method 60 illustrated in FIG. 5A or a similar method. The controller 42 stores and maintains a model 50 of the virtual visual space 20. The model may be provided to the controller 42 or determined by the controller 42. For example, sensors in input circuitry 44 may be used to create overlapping depth maps of the virtual visual space from different points of view and a three dimensional model may then be produced.

There are many different technologies that may be used to create a depth map. An example of a passive system, used in the Kinect™ device, is when an object is painted with a non-homogenous pattern of symbols using infrared light and the reflected light is measured using multiple cameras and then processed, using the parallax effect, to determine a position of the object.

At block 62 it is determined whether or not the model of the virtual visual space 20 has changed. If the model of the virtual visual space 20 has changed the method moves to block 66. If the model of the virtual visual space 20 has not changed the method moves to block 64.

At block 64 it is determined whether or not the point of view 24 in the virtual visual space 20 has changed. If the point of view 24 has changed the method moves to block 66. If the point of view 24 has not changed the method returns to block 62.

At block 66, a two-dimensional projection of the three-dimensional virtual visual space 20 is taken from the location 23 and in the direction 25 defined by the current point of view 24. The projection is then limited by the field of view 26 to produce the virtual visual scene 22. The method then returns to block 62.

Where the apparatus 30 enables augmented reality, the virtual visual space 20 comprises objects 11 from the real space 10 and also visual elements 28 not present in the real space 10. The combination of such visual elements 28 may be referred to as the artificial virtual visual space. FIG. 5B illustrates a method 70 for updating a model of the virtual visual space 20 for augmented reality.

At block 72 it is determined whether or not the real space 10 has changed. If the real space 10 has changed the method moves to block 76. If the real space 10 has not changed the method moves to block 74. Detecting a change in the real space 10 may be achieved at a pixel level using differencing and may be achieved at an object level using computer vision to track objects as they move.

At block 74 it is determined whether or not the artificial virtual visual space has changed. If the artificial virtual visual space has changed the method moves to block 76. If the artificial virtual visual space has not changed the method returns to block 72. As the artificial virtual visual space is generated by the controller 42 changes to the visual elements 28 are easily detected.

At block 76, the model of the virtual visual space 20 is updated.

The apparatus 30 may enable user-interactive mediation for mediated reality and/or augmented reality and/or virtual reality. The user input circuitry 44 detects user actions using user input 43. These user actions are used by the controller 42 to determine what happens within the virtual visual space 20. This may enable interaction with a visual element 28 within the virtual visual space 20.

The apparatus 30 may enable perspective mediation for mediated reality and/or augmented reality and/or virtual reality. The user input circuitry 44 detects user actions. These user actions are used by the controller 42 to determine the point of view 24 within the virtual visual space 20, changing the virtual visual scene 22. The point of view 24 may be continuously variable in position and/or direction and user action changes the position and/or direction of the point of view 24. Alternatively, the point of view 24 may have discrete quantised positions and/or discrete quantised directions and user action switches by jumping to the next position and/or direction of the point of view 24.

The apparatus 30 may enable first person perspective for mediated reality, augmented reality or virtual reality. The user input circuitry 44 detects the user's real point of view 14 using user point of view sensor 45. The user's real point of view is used by the controller 42 to determine the point of view 24 within the virtual visual space 20, changing the virtual visual scene 22. Referring back to FIG. 3A, a user 18 has a real point of view 14. The real point of view may be changed by the user 18. For example, a real location 13 of the real point of view 14 is the location of the user 18 and can be changed by changing the physical location 13 of the user 18. For example, a real direction 15 of the real point of view 14 is the direction in which the user 18 is looking and can be changed by changing the real direction of the user 18. The real direction 15 may, for example, be changed by a user 18 changing an orientation of their head or view point and/or a user changing a direction of their gaze. A head-mounted apparatus 30 may be used to enable first-person perspective mediation by measuring a change in orientation of the user's head and/or a change in the user's direction of gaze.

In some but not necessarily all examples, the apparatus 30 comprises as part of the input circuitry 44 point of view sensors 45 for determining changes in the real point of view.

For example, positioning technology such as GPS, triangulation (trilateration) by transmitting to multiple receivers and/or receiving from multiple transmitters, acceleration detection and integration may be used to determine a new physical location 13 of the user 18 and real point of view 14.

For example, accelerometers, electronic gyroscopes or electronic compasses may be used to determine a change in an orientation of a user's head or view point and a consequential change in the real direction 15 of the real point of view 14.

For example, pupil tracking technology, based for example on computer vision, may be used to track movement of a user's eye or eyes and therefore determine a direction of a user's gaze and consequential changes in the real direction 15 of the real point of view 14.

The apparatus 30 may comprise as part of the input circuitry 44 image sensors 47 for imaging the real space 10.

An example of an image sensor 47 is a digital image sensor that is configured to operate as a camera. Such a camera may be operated to record static images and/or video images. In some, but not necessarily all embodiments, cameras may be configured in a stereoscopic or other spatially distributed arrangement so that the real space 10 is viewed from different perspectives. This may enable the creation of a three-dimensional image and/or processing to establish depth, for example, via the parallax effect.

In some, but not necessarily all embodiments, the input circuitry 44 comprises depth sensors 49. A depth sensor 49 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the real space 10 with light, preferably invisible light such as infrared light, with a spatially dependent pattern. Detection of a certain pattern by the receiver allows the real space 10 to be spatially resolved. The distance to the spatially resolved portion of the real space 10 may be determined by time of flight and/or stereoscopy (if the receiver is in a stereoscopic position relative to the transmitter).

In some but not necessarily all embodiments, the input circuitry 44 may comprise communication circuitry 41 in addition to or as an alternative to one or more of the image sensors 47 and the depth sensors 49. Such communication circuitry 41 may communicate with one or more remote image sensors 47 in the real space 10 and/or with remote depth sensors 49 in the real space 10.

Figure 6A:
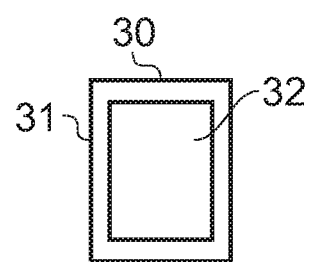
FIGS. 6A and 6B illustrate examples of apparatus that enable display of at least parts of the virtual visual scene to a user.
Figure 6B:
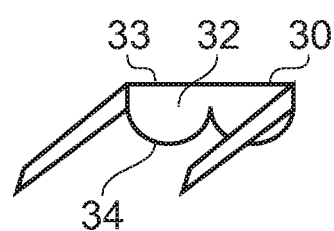

FIGS. 6A and 6B illustrate examples of apparatus 30 that enable display of at least parts of the virtual visual scene 22 to a user.

FIG. 6A illustrates a handheld apparatus 31 comprising a display screen as display 32 that displays images to a user and is used for displaying the virtual visual scene 22 to the user. The apparatus 30 may be moved deliberately in the hands of a user in one or more of the previously mentioned six degrees of freedom. The handheld apparatus 31 may house the sensors 45 for determining changes in the real point of view from a change in orientation of the apparatus 30.

The handheld apparatus 31 may be or may be operated as a see-video arrangement for augmented reality that enables a live or recorded video of a real visual scene 12 to be displayed on the display 32 for viewing by the user while one or more visual elements 28 are simultaneously displayed on the display 32 for viewing by the user. The combination of the displayed real visual scene 12 and displayed one or more visual elements 28 provides the virtual visual scene 22 to the user.

If the handheld apparatus 31 has a camera mounted on a face opposite the display 32, it may be operated as a see-video arrangement that enables a live real visual scene 12 to be viewed while one or more visual elements 28 are displayed to the user to provide in combination the virtual visual scene 22.

FIG. 6B illustrates a head-mounted apparatus 33 comprising a display 32 that displays images to a user. The head-mounted apparatus 33 may be moved automatically when a head of the user moves. The head-mounted apparatus 33 may house the sensors 45 for gaze direction detection and/or selection gesture detection.

The head-mounted apparatus 33 may be a see-through arrangement for augmented reality that enables a live real visual scene 12 to be viewed while one or more visual elements 28 are displayed by the display 32 to the user to provide in combination the virtual visual scene 22. In this case a visor 34, if present, is transparent or semi-transparent so that the live real visual scene 12 can be viewed through the visor 34.

The head-mounted apparatus 33 may be operated as a see-video arrangement for augmented reality that enables a live or recorded video of a real visual scene 12 to be displayed by the display 32 for viewing by the user while one or more visual elements 28 are simultaneously displayed by the display 32 for viewing by the user. The combination of the displayed real visual scene 12 and displayed one or more visual elements 28 provides the virtual visual scene 22 to the user. In this case a visor 34 is opaque and may be used as display 32.

Other examples of apparatus 30 that enable display of at least parts of the virtual visual scene 22 to a user may be used.

For example, one or more projectors may be used that project one or more visual elements to provide augmented reality by supplementing a real visual scene of a physical real world environment (real space).

For example, multiple projectors or displays may surround a user to provide virtual reality by presenting a fully artificial environment (a virtual visual space) as a virtual visual scene to the user.

Referring back to FIG. 4, an apparatus 30 may enable user-interactive mediation for mediated reality and/or augmented reality and/or virtual reality. The user input circuitry 44 detects user actions using user input 43. These user actions are used by the controller 42 to determine what happens within the virtual visual space 20. This may enable interaction with a visual element 28 within the virtual visual space 20.

The detected user actions may, for example, be gestures performed in the real space 10. Gestures may be detected in a number of ways. For example, depth sensors 49 may be used to detect movement of parts a user 18 and/or or image sensors 47 may be used to detect movement of parts of a user 18 and/or positional/movement sensors attached to a limb of a user 18 may be used to detect movement of the limb.

Object tracking may be used to determine when an object or user changes. For example, tracking the object on a large macro-scale allows one to create a frame of reference that moves with the object. That frame of reference can then be used to track time-evolving changes of shape of the object, by using temporal differencing with respect to the object. This can be used to detect small scale human motion such as gestures, hand movement, finger movement, and/or facial movement. These are scene independent user (only) movements relative to the user.

The apparatus 30 may track a plurality of objects and/or points in relation to a user's body, for example one or more joints of the user's body. In some examples, the apparatus 30 may perform full body skeletal tracking of a user's body. In some examples, the apparatus 30 may perform digit tracking of a user's hand.

The tracking of one or more objects and/or points in relation to a user's body may be used by the apparatus 30 in gesture recognition.

Figure 7A:
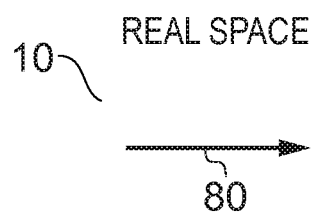
FIG. 7A, illustrates an example of a gesture in real space

Referring to FIG. 7A, a particular gesture 80 in the real space 10 is a gesture user input used as a 'user control' event by the controller 42 to determine what happens within the virtual visual space 20. A gesture user input is a gesture 80 that has meaning to the apparatus 30 as a user input.

Figure 7B:
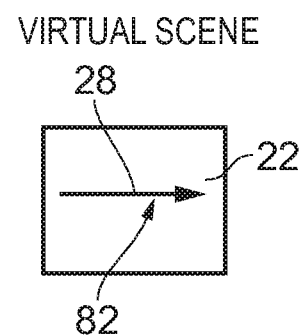
FIG. 7B, illustrates a corresponding representation rendered, in the virtual visual scene, of the gesture in real space.

Referring to FIG. 7B, illustrates that in some but not necessarily all examples, a corresponding representation of the gesture 80 in real space is rendered in the virtual visual scene 22 by the apparatus 30. The representation involves one or more visual elements 28 moving 82 to replicate or indicate the gesture 80 in the virtual visual scene 22.

A gesture 80 may be static or moving. A moving gesture may comprise a movement or a movement pattern comprising a series of movements. For example it could be making a circling motion or a side to side or up and down motion or the tracing of a sign in space. A moving gesture may, for example, be an apparatus-independent gesture or an apparatus-dependent gesture. A moving gesture may involve movement of a user input object e.g. a user body part or parts, or a further apparatus, relative to the sensors. The body part may comprise the user's hand or part of the user's hand such as one or more fingers and thumbs. In other examples, the user input object may comprise a different part of the body of the user such as their head or arm. Three-dimensional movement may comprise motion of the user input object in any of six degrees of freedom. The motion may comprise the user input object moving towards or away from the sensors as well as moving in a plane parallel to the sensors or any combination of such motion.

A gesture 80 may be a non-contact gesture. A non-contact gesture does not contact the sensors at any time during the gesture.

A gesture 80 may be an absolute gesture that is defined in terms of an absolute displacement from the sensors. Such a gesture may be tethered, in that it is performed at a precise location in the real space 10. Alternatively a gesture 80 may be a relative gesture that is defined in terms of relative displacement during the gesture. Such a gesture may be un-tethered, in that it need not be performed at a precise location in the real space 10 and may be performed at a large number of arbitrary locations.

A gesture 80 may be defined as evolution of displacement, of a tracked point relative to an origin, with time. It may, for example, be defined in terms of motion using time variable parameters such as displacement, velocity or using other kinematic parameters. An un-tethered gesture may be defined as evolution of relative displacement $\Delta d$ with relative time $\Delta t$.

A gesture 80 may be performed in one spatial dimension (1D gesture), two spatial dimensions (2D gesture) or three spatial dimensions (3D gesture).

Figure 8:
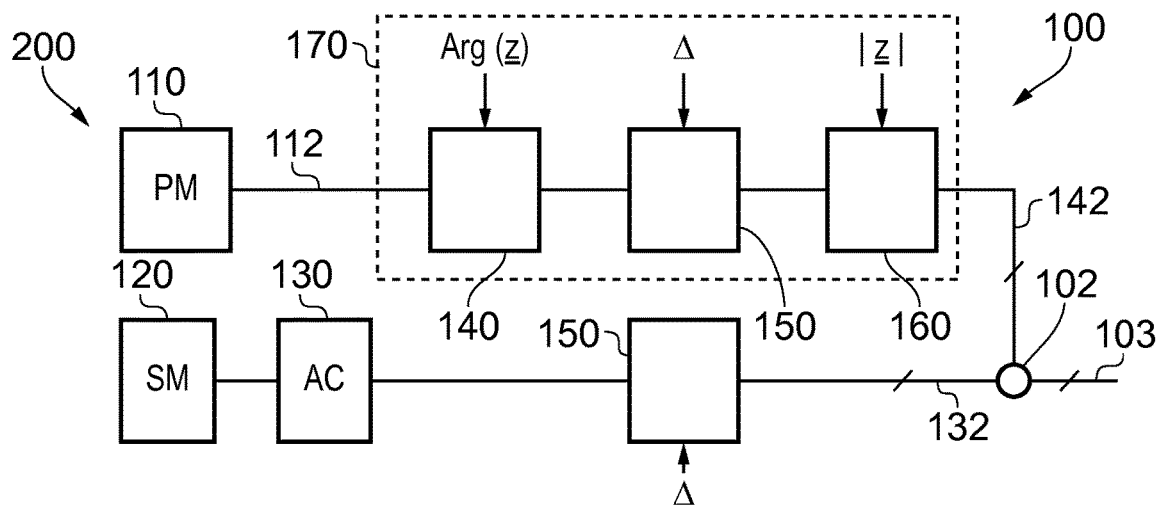
FIG. 8 illustrates an example of a system for modifying a rendered sound scene.

FIG. 8 illustrates an example of a system 100 and also an example of a method 200. The system 100 and method 200 record a sound space and process the recorded sound space to enable a rendering of the recorded sound space as a rendered sound scene for a listener at a particular position (the origin) and orientation within the sound space.

A sound space is an arrangement of sound sources in a three-dimensional space. A sound space may be defined in relation to recording sounds (a recorded sound space) and in relation to rendering sounds (a rendered sound space). The sound space as rendered may be different to a sound space as recorded because sound objects have been added, remove or adapted. An additional sound object may, for example, be recorded or created in a studio, for example, by sampling a library, independently recording sound or by mixing sounds to form a studio sound.

The system 100 comprises one or more portable microphones 110 and may comprise one or more static microphones 120.

In this example, but not necessarily all examples, the origin of the sound space is at a microphone. In this example, the microphone at the origin is a static microphone 120. It may record one or more channels, for example it may be a microphone array. However, the origin may be at any arbitrary position.

In this example, only a single static microphone 120 is illustrated. However, in other examples multiple static microphones 120 may be used independently.

The system 100 comprises one or more portable microphones 110. The portable microphone 110 may, for example, move with a sound source within the recorded sound space. The portable microphone may, for example, be an 'up-close' microphone that remains close to a sound source. This may be achieved, for example, using a boom microphone or, for example, by attaching the microphone to the sound source, for example, by using a Lavalier microphone. The portable microphone 110 may record one or more recording channels.

The relative position of the portable microphone PM 110 from the origin may be represented by the vector z. The vector z therefore positions the portable microphone 110 relative to a notional listener of the recorded sound space.

The relative orientation of the notional listener at the origin may be represented by the value Δ. The orientation value Δ defines the notional listener's 'point of view' which defines the sound scene. The sound scene is a representation of the sound space listened to from a particular point of view within the sound space.

When the sound space as recorded is rendered to a user (listener) via the system 100 in FIG. 1, it is rendered to the listener as if the listener is positioned at the origin of the recorded sound space with a particular orientation. It is therefore important that, as the portable microphone 110 moves in the recorded sound space, its position z relative to the origin of the recorded sound space is tracked and is correctly represented in the rendered sound space. The system 100 is configured to achieve this.

The audio signals 122 output from the static microphone 120 are coded by audio coder 130 into a multichannel audio signal 132. If multiple static microphones were present, the output of each would be separately coded by an audio coder into a multichannel audio signal.

The audio coder 130 may be a spatial audio coder such that the multichannel audio signals 132 represent the sound space as recorded by the static microphone 120 and can be rendered giving a spatial audio effect. For example, the audio coder 130 may be configured to produce multichannel audio signals 132 according to a defined standard such as, for example, binaural coding, 5.1 surround sound coding, 7.1 surround sound coding etc. If multiple static microphones were present, the multichannel signal of each static microphone would be produced according to the same defined standard such as, for example, binaural coding, 5.1 surround sound coding, and 7.1 surround sound coding and in relation to the same common rendered sound space.

The multichannel audio signals 132 from one or more the static microphones 120 are mixed by mixer 102 with multichannel audio signals 142 from the one or more portable microphones 110 to produce a multi-microphone multichannel audio signal 103 that represents the recorded sound scene relative to the origin and which can be rendered by an audio decoder corresponding to the audio coder 130 to reproduce a rendered sound scene to a listener that corresponds to the recorded sound scene when the listener is at the origin.

The multichannel audio signal 142 from the, or each, portable microphone 110 is processed before mixing to take account of any movement of the portable microphone 110 relative to the origin at the static microphone 120.

The audio signals 112 output from the portable microphone 110 are processed by the positioning block 140 to adjust for movement of the portable microphone 110 relative to the origin. The positioning block 140 takes as an input the vector z or some parameter or parameters dependent upon the vector z. The vector z represents the relative position of the portable microphone 110 relative to the origin.

The positioning block 140 may be configured to adjust for any time misalignment between the audio signals 112 recorded by the portable microphone 110 and the audio signals 122 recorded by the static microphone 120 so that they share a common time reference frame. This may be achieved, for example, by correlating naturally occurring or artificially introduced (non-audible) audio signals that are present within the audio signals 112 from the portable microphone 110 with those within the audio signals 122 from the static microphone 120. Any timing offset identified by the correlation may be used to delay/advance the audio signals 112 from the portable microphone 110 before processing by the positioning block 140.

The positioning block 140 processes the audio signals 112 from the portable microphone 110, taking into account the relative orientation (Arg(z)) of that portable microphone 110 relative to the origin at the static microphone 120.

The audio coding of the static microphone audio signals 122 to produce the multichannel audio signal 132 assumes a particular orientation of the rendered sound space relative to an orientation of the recorded sound space and the audio signals 122 are encoded to the multichannel audio signals 132 accordingly.

The relative orientation Arg (z) of the portable microphone 110 in the recorded sound space is determined and the audio signals 112 representing the sound object are coded to the multichannels defined by the audio coding 130 such that the sound object is correctly oriented within the rendered sound space at a relative orientation Arg (z) from the listener. For example, the audio signals 112 may first be mixed or encoded into the multichannel signals 142 and then a transformation T may be used to rotate the multichannel audio signals 142, representing the moving sound object, within the space defined by those multiple channels by Arg (z).

An orientation block 150 may be used to rotate the multichannel audio signals 142 by Δ, if necessary. Similarly, an orientation block 150 may be used to rotate the multichannel audio signals 132 by Δ, if necessary.

The functionality of the orientation block 150 is very similar to the functionality of the orientation function of the positioning block 140 except it rotates by Δ instead of Arg(z).

In some situations, for example when the sound scene is rendered to a listener through a head-mounted audio output device 300, for example headphones using binaural audio coding, it may be desirable for the rendered sound space 310 to remain fixed in space 320 when the listener turns their head 330 in space. This means that the rendered sound space 310 needs to be rotated relative to the audio output device 300 by the same amount in the opposite sense to the head rotation. The orientation of the rendered sound space 310 tracks with the rotation of the listener's head so that the orientation of the rendered sound space 310 remains fixed in space 320 and does not move with the listener's head 330.

The portable microphone signals 112 are additionally processed to control the perception of the distance D of the sound object from the listener in the rendered sound scene, for example, to match the distance |z| of the sound object from the origin in the recorded sound space. This can be useful when binaural coding is used so that the sound object is, for example, externalized from the user and appears to be at a distance rather than within the user's head, between the user's ears. The distance block 160 processes the multichannel audio signal 142 to modify the perception of distance.

Figure 9:
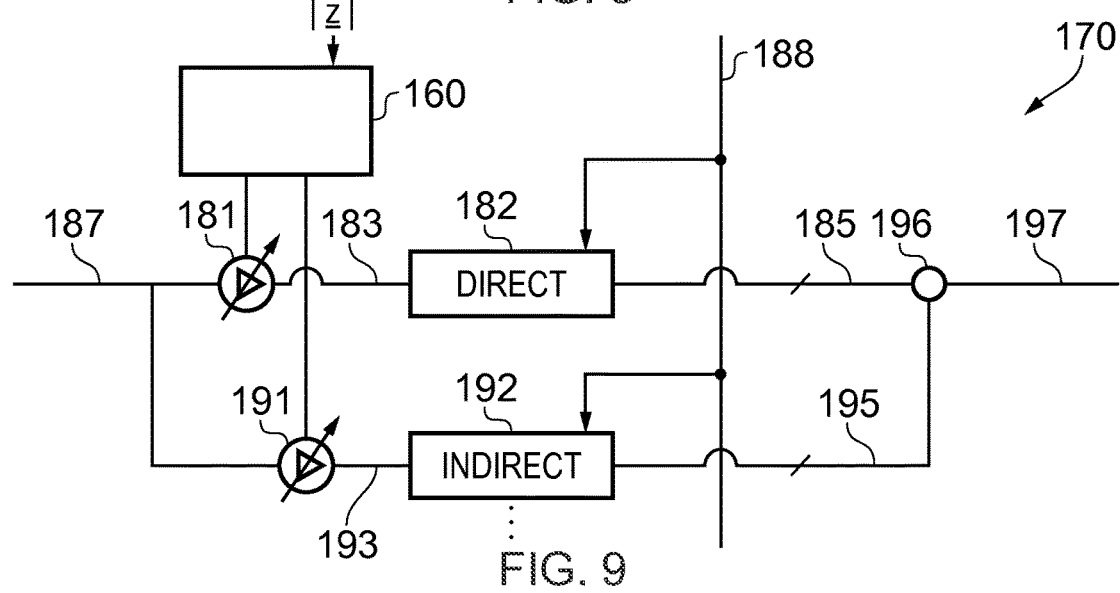
FIG. 9 illustrates an example of a module which may be used, for example, to perform the functions of the positioning block, orientation block and distance block of the system.

FIG. 9 illustrates a module 170 which may be used, for example, to perform the method 200 and/or functions of the positioning block 140, orientation block 150 and distance block 160 in FIG. 8. The module 170 may be implemented using circuitry and/or programmed processors.

The Figure illustrates the processing of a single channel of the multichannel audio signal 142 before it is mixed with the multichannel audio signal 132 to form the multi-microphone multichannel audio signal 103. A single input channel of the multichannel signal 142 is input as signal 187.

The input signal 187 passes in parallel through a "direct" path and one or more "indirect" paths before the outputs from the paths are mixed together, as multichannel signals, by mixer 196 to produce the output multichannel signal 197. The output multichannel signal 197, for each of the input channels, are mixed to form the multichannel audio signal 142 that is mixed with the multichannel audio signal 132.

The direct path represents audio signals that appear, to a listener, to have been received directly from an audio source and an indirect path represents audio signals that appear to a listener to have been received from an audio source via an indirect path such as a multipath or a reflected path or a refracted path.

The distance block 160 by modifying the relative gain between the direct path and the indirect paths, changes the perception of the distance D of the sound object from the listener in the rendered sound space 310.

Each of the parallel paths comprises a variable gain device 181, 191 which is controlled by the distance block 160.

The perception of distance can be controlled by controlling relative gain between the direct path and the indirect (decorrelated) paths. Increasing the indirect path gain relative to the direct path gain increases the perception of distance.

In the direct path, the input signal 187 is amplified by variable gain device 181, under the control of the distance block 160, to produce a gain-adjusted signal 183. The gain-adjusted signal 183 is processed by a direct processing module 182 to produce a direct multichannel audio signal 185.

In the indirect path, the input signal 187 is amplified by variable gain device 191, under the control of the distance block 160, to produce a gain-adjusted signal 193. The gain-adjusted signal 193 is processed by an indirect processing module 192 to produce an indirect multichannel audio signal 195.

The direct multichannel audio signal 185 and the one or more indirect multichannel audio signals 195 are mixed in the mixer 196 to produce the output multichannel audio signal 197.

The direct processing block 182 and the indirect processing block 192 both receive direction of arrival signals 188. The direction of arrival signal 188 gives the orientation Arg(z) of the portable microphone 110 (moving sound object) in the recorded sound space and the orientation Δ of the rendered sound space 310 relative to the notional listener/audio output device 300.

The position of the moving sound object changes as the portable microphone 110 moves in the recorded sound space and the orientation of the rendered sound space changes as a head-mounted audio output device, rendering the sound space rotates.

The direct processing block 182 may, for example, include a system 184 that rotates the single channel audio signal, gain-adjusted input signal 183, in the appropriate multichannel space producing the direct multichannel audio signal 185. The system uses a transfer function to performs a transformation T that rotates multichannel signals within the space defined for those multiple channels by Arg(z) and by Δ, defined by the direction of arrival signal 188. For example, a head related transfer function (HRTF) interpolator may be used for binaural audio. As another example, Vector Base Amplitude Panning (VBAP) may be used for loudspeaker format (e.g. 5.1) audio.

The indirect processing block 192 may, for example, use the direction of arrival signal 188 to control the gain of the single channel audio signal, the gain-adjusted input signal 193, using a variable gain device 194. The amplified signal is then processed using a static decorrelator 196 and a static transformation T to produce the indirect multichannel audio signal 195. The static decorrelator in this example uses a pre-delay of at least 2 ms. The transformation T rotates multichannel signals within the space defined for those multiple channels in a manner similar to the direct system but by a fixed amount. For example, a static head related transfer function (HRTF) interpolator may be used for binaural audio.

It will therefore be appreciated that the module 170 can be used to process the portable microphone signals 112 and perform the functions of:

(i) changing the relative position (orientation Arg(z) and/or distance |z|) of a sound object, from a listener in the rendered sound space and (ii) changing the orientation of the rendered sound space (including the sound object positioned according to (i)).

It should also be appreciated that the module 170 may also be used for performing the function of the orientation block 150 only, when processing the audio signals 122 provided by the static microphone 120. However, the direction of arrival signal will include only A and will not include Arg(z). In some but not necessarily all examples, gain of the variable gain devices 191 modifying the gain to the indirect paths may be put to zero and the gain of the variable gain device 181 for the direct path may be fixed. In this instance, the module 170 reduces to a system that rotates the recorded sound space to produce the rendered sound space according to a direction of arrival signal that includes only A and does not include Arg(z).

Figure 10:
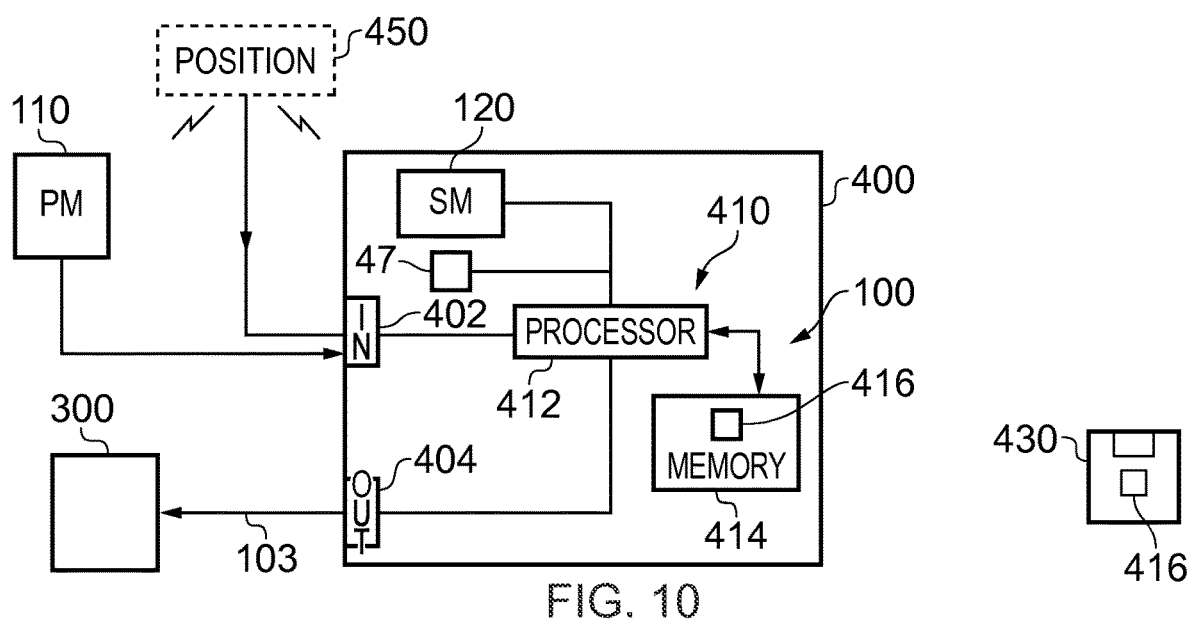
FIG. 10 illustrates an example of the system/module implemented using an apparatus.

FIG. 10 illustrates an example of the system 100 implemented using an apparatus 400. The apparatus 400 may, for example, be a static electronic device, a portable electronic device or a hand-portable electronic device that has a size that makes it suitable to carried on a palm of a user or in an inside jacket pocket of the user.

In this example, the apparatus 400 comprises the static microphone 120 as an integrated microphone but does not comprise the one or more portable microphones 110 which are remote. In this example, but not necessarily all examples, the static microphone 120 is a microphone array. However, in other examples, the apparatus 400 does not comprise the static microphone 120.

The apparatus 400 comprises an external communication interface 402 for communicating externally with external microphones, for example, the remote portable microphone(s) 110. This may, for example, comprise a radio transceiver.

A positioning system 450 is illustrated as part of the system 100. This positioning system 450 is used to position the portable microphone(s) 110 relative to the origin of the sound space e.g. the static microphone 120. In this example, the positioning system 450 is illustrated as external to both the portable microphone 110 and the apparatus 400. It provides information dependent on the position z of the portable microphone 110 relative to the origin of the sound space to the apparatus 400. In this example, the information is provided via the external communication interface 402, however, in other examples a different interface may be used. Also, in other examples, the positioning system may be wholly or partially located within the portable microphone 110 and/or within the apparatus 400.

The position system 450 provides an update of the position of the portable microphone 110 with a particular frequency and the term 'accurate' and 'inaccurate' positioning of the sound object should be understood to mean accurate or inaccurate within the constraints imposed by the frequency of the positional update. That is accurate and inaccurate are relative terms rather than absolute terms.

The position system 450 enables a position of the portable microphone 110 to be determined. The position system 450 may receive positioning signals and determine a position which is provided to the processor 412 or it may provide positioning signals or data dependent upon positioning signals so that the processor 412 may determine the position of the portable microphone 110.

There are many different technologies that may be used by a position system 450 to position an object including passive systems where the positioned object is passive and does not produce a positioning signal and active systems where the positioned object produces one or more positioning signals. An example of system, used in the Kinect™ device, is when an object is painted with a non-homogenous pattern of symbols using infrared light and the reflected light is measured using multiple cameras and then processed, using the parallax effect, to determine a position of the object. An example of an active radio positioning system is when an object has a transmitter that transmits a radio positioning signal to multiple receivers to enable the object to be positioned by, for example, trilateration or triangulation. An example of a passive radio positioning system is when an object has a receiver or receivers that receive a radio positioning signal from multiple transmitters to enable the object to be positioned by, for example, trilateration or triangulation. Trilateration requires an estimation of a distance of the object from multiple, non-aligned, transmitter/receiver locations at known positions. A distance may, for example, be estimated using time of flight or signal attenuation. Triangulation requires an estimation of a bearing of the object from multiple, non-aligned, transmitter/receiver locations at known positions. A bearing may, for example, be estimated using a transmitter that transmits with a variable narrow aperture, a receiver that receives with a variable narrow aperture, or by detecting phase differences at a diversity receiver.

Other positioning systems may use dead reckoning and inertial movement or magnetic positioning.

The object that is positioned may be the portable microphone 110 or it may an object worn or carried by a person associated with the portable microphone 110 or it may be the person associated with the portable microphone 110.

The apparatus 400 wholly or partially operates the system 100 and method 200 described above to produce a multi-microphone multichannel audio signal 103.

The apparatus 400 provides the multi-microphone multi-channel audio signal 103 via an output communications interface 404 to an audio output device 300 for rendering.

In some but not necessarily all examples, the audio output device 300 may use binaural coding. Alternatively or additionally, in some but not necessarily all examples, the audio output device 300 may be a head-mounted audio output device.

In this example, the apparatus 400 comprises a controller 410 configured to process the signals provided by the static microphone 120 and the portable microphone 110 and the positioning system 450. In some examples, the controller 410 may be required to perform analogue to digital conversion of signals received from microphones 110, 120 and/or perform digital to analogue conversion of signals to the audio output device 300 depending upon the functionality at the microphones 110, 120 and audio output device 300. However, for clarity of presentation no converters are illustrated in FIG. 9.

Implementation of a controller 410 may be as controller circuitry. The controller 410 may be implemented in hardware alone, have certain aspects in software including firmware alone or can be a combination of hardware and software (including firmware).

As illustrated in FIG. 10 the controller 410 may be implemented using instructions that enable hardware functionality, for example, by using executable instructions of a computer program 416 in a general-purpose or special-purpose processor 412 that may be stored on a computer readable storage medium (disk, memory etc) to be executed by such a processor 412.

The processor 412 is configured to read from and write to the memory 414. The processor 412 may also comprise an output interface via which data and/or commands are output by the processor 412 and an input interface via which data and/or commands are input to the processor 412.

The memory 414 stores a computer program 416 comprising computer program instructions (computer program code) that controls the operation of the apparatus 400 when loaded into the processor 412. The computer program instructions, of the computer program 416, provide the logic and routines that enables the apparatus to perform the methods illustrated in FIGS. 1-12. The processor 412 by reading the memory 414 is able to load and execute the computer program 416.

The blocks illustrated in the FIGS. 8 and 9 may represent steps in a method and/or sections of code in the computer program 416. The illustration of a particular order to the blocks does not necessarily imply that there is a required or preferred order for the blocks and the order and arrangement of the block may be varied. Furthermore, it may be possible for some blocks to be omitted.

The preceding description describes, in relation to FIGS. 1 to 7, a system, apparatus 30, method 60 and computer program 48 that enables control of a virtual visual space 20 and the virtual visual scene 26 dependent upon the virtual visual space 20.

The preceding description describes. in relation to FIGS. 8 to 10, a system 100, apparatus 400, method 200 and computer program 416 that enables control of a sound space and the sound scene dependent upon the sound space.

In some but not necessarily all examples, the virtual visual space 20 and the sound space may be corresponding. "Correspondence" or "corresponding" when used in relation to a sound space and a virtual visual space means that the sound space and virtual visual space are time and space aligned, that is they are the same space at the same time.

The correspondence between virtual visual space and sound space results in correspondence between the virtual visual scene and the sound scene. "Correspondence" or "corresponding" when used in relation to a sound scene and a virtual visual scene means that the sound space and virtual visual space are corresponding and a notional listener whose point of view defines the sound scene and a notional viewer whose point of view defines the virtual visual scene are at the same position and orientation, that is they have the same point of view.

The following description describes in relation to FIGS. 11 to 16 a method 500 that enables control of sound objects based on past actions of a user. The method 500 may be performed by a system as previously described, an apparatus as previously described and/or a computer program as previously described.

Figure 11:
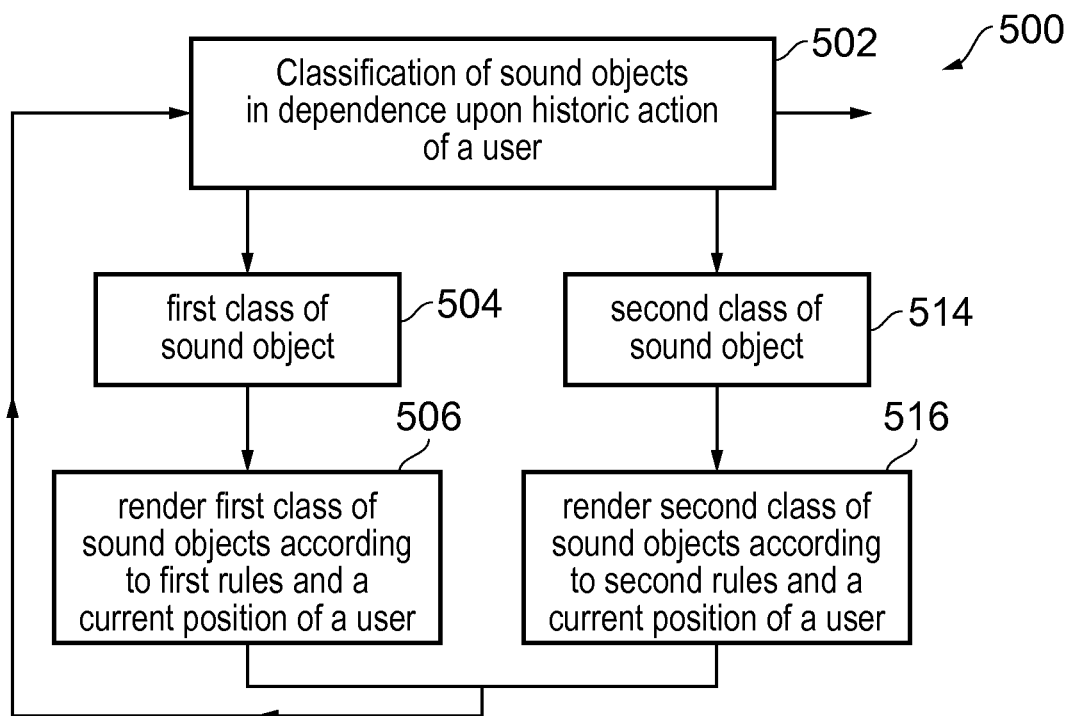
FIG. 11 illustrates an example of a method, for controlling rendering of sound objects.

FIG. 11 illustrates an example of a method 500, for controlling rendering of sound objects.

At block 502, the method classifies sound objects, within a rendered virtual space, as a first class of sound object (block 504) or a second class of sound object (block 514). The classification is in dependence upon historic action of a user within the virtual space.

At block 506, the one or more sound objects that have been classified as the first class are rendered according to at least first rules within the virtual space.

At block 506, the one or more sound objects that have been classified as the second class are rendered according to at least second rules and a current position of the user within the virtual space.

An historic action of a user is an action that has occurred in the past rather than the present. The classification of the sound objects is therefore dependent upon a 'memory effect', that is, what has occurred previously. Data may be stored recording past actions of the user to enable classification in dependence upon historic action of the user.

The 'memory effect' arising from classification in dependence upon historic action of a user results in the rendering of at least some of the sound objects (first class and/or second class) in dependence upon historic action of a user within the virtual space. That is the memory effect is based on actions within the virtual space.

The rendering is, however, not solely dependent upon the classification of a sound object according to historic action of a user. The rendering is also dependent upon the current position of the user within the virtual space. There is therefore a real-time dynamic aspect to the rendering based upon a position of the user within the virtual space.

This creates a virtual space, spatial memory effect where a rendered sound scene comprising sound objects located at different locations within the virtual space depends not only upon the position of the user (listener) within the virtual space at that time (real-time effect) but also upon historic action of a user within the virtual space (memory effect). Therefore action of a user in the virtual space has a real time effect via rendering based on real-time position of the user in the virtual space and a memory effect via rendering based on differential rendering dependent upon historic action of the user in the virtual space.

The method 500 may, for example, be used to improve user perception of the one or more sound objects of the first class relative to the one or more sound objects of the second class. In this example, a difference between the first rules and second rules result is a difference in the sound objects as rendered.

In addition or alternatively, the method 500 may, for example, be used to improve user perception of the one or more sound objects of the first class, as rendered, relative to the one or more sound objects of the first class as recorded. In this example, the first rules modify the sound object as recorded.

Rendering of a sound object of the first class comprises, in at least some examples, adapting at least one property of the sound object, as recorded, when the sound object is rendered.

Differences between the first rules and the second rules, cause a relative shift in one or more property values between the one or more sound objects of the first class and the one or more sound objects of the second class.

Examples of sound object properties include but are not necessarily limited to:

frequency properties, that is the frequency (pitch) of the sound object;

intensity properties, that is the intensity (power per unit area) of the sound object;

environmental properties, such as the amount of reflection/reverberation;

positional properties, that is the position of the sound object within the virtual space.

Variation of a frequency property of a sound object may, for example, place the sound object as rendered in a different critical band compared to the sound object as recorded. This frequency diversity may improve the user's ability to hear the sound object of the first class or reduce a user's ability to hear the sound object of the second class.

Variation of an intensity property of a sound object may, for example, artificially increase the loudness of the sound object of the first class compared to that sound object as recorded or artificially reduce the loudness of the sound object of the second class compared to that sound object as recorded. This may improve the user's ability to hear the sound object of the first class or reduce a user's ability to hear the sound object of the second class.

Variation of an environmental property of a sound object may, for example, increase or reduce reverberations (the gain of the indirect path relative to the direct path). This may be used to improve the user's ability to hear the sound object of the first class or reduce a user's ability to hear the sound object of the second class.

Variation of a positional property of a sound object may, for example, change the position of the sound object in the virtual space. This may be used to improve the user's ability to hear the sound object of the first class (e.g. by separating it spatially from other sound objects or by bringing it closer to the user) or reduce a user's ability to hear the sound object of the second class.

In some but not necessarily all examples, rendering of the sound objects of the second class according to second rules causes properties of the sound object as recorded to be used, un-adapted, when the sound object of the second class is rendered.

FIGS. 12A to 12F illustrate an example application of the method 500.

As previously described, the rendering of a sound object 620 depends upon a position of that sound object 620 relative to a user 630 (notional listener). When the sound object 620 is stationary the rendering of the sound object 620 depends upon the properties of the sound object as recorded and the position of the user 630. When the sound object 620 is moving, the rendering of the sound object 620 depends upon the properties of the sound object 620 as recorded and the position of the user 630 and the position of the sound object 620. In the following examples, it is assumed that the user 630 moves relative to stationary sound objects 620. However, this is merely to facilitate the description of an application of the method 500. In other examples, the method 500 may be applied to sound objects 620 which move or some of which move by simple extension.

The figures illustrate a two-dimensional virtual space 600, however, the method 500 has application to any virtual space 600 including three dimensional spaces.

In the example of FIGS. 12A to 12F, the virtual space 600 may be sound space 610 only or may be a mixed virtual space of corresponding visual virtual space 20 and sound space 610. For the purpose of the following description it is assumed that the virtual space 600 is a mixed virtual space. Within the visual virtual space 20 the sound objects 620 may, in some examples, be represented by a virtual object 21, for example, a computer generated virtual object 28.

Figure 12A:
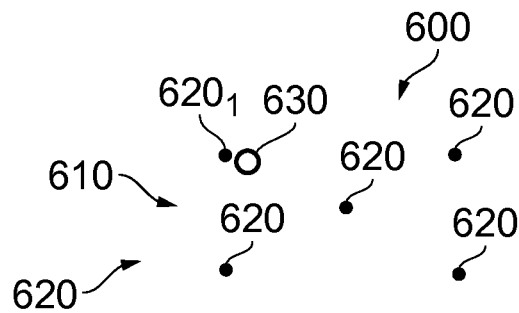
FIGS. 12A to 12F illustrate an example application of the method of FIG. 11.

FIG. 12A illustrates a plurality of different sound objects 620 that are located at different positions p within an unmodified virtual space 600 (sound space 610) V. A user 630 is able to move within the virtual space 610. The user 610 represents the position P of a notional listener. Without operation of the method 500, the sound objects 620 are rendered according to a current position P of the user 630 within the virtual space 600. Each sound object 620 has a relative position to the user 630 which changes as the user changes position P. The sound objects 620 are rendered to the user 630 from the correct relative positions. The sound space 610, as rendered to a user 630, is therefore the same as the sound space 610 as recorded.

In the examples of FIG. 12A to 12F, it is assumed for the purpose of this explanation that all of the sound objects 620 are in a default state that causes them to be rendered as recorded. The method 500 will change the state of at least some of these sound objects 620 so that they are no longer rendered as recorded. Those sound objects 620 that will not be rendered as recorded are classified as a first class of sound objects and those sound objects that will be rendered as recorded are classified as a second class of sound objects.

In FIG. 12A, the user 630 performs an 'activation' action within the virtual space 600 in relation to the sound object 620$_1$. This activation action is sufficient to cause a change in state of the sound object 620$_1$ and its re-classification from the second class to the first class.

Figure 12B:
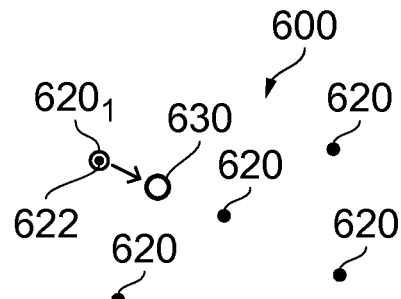

In FIG. 12B an indication 622 is used to identify the sound object 620$_1$ as a sound object of the first class. This indication 622 may be a computer-generated virtual object 28. However, in other examples, an indication 622 is not used.

FIG. 12B illustrates the virtual space 600 of FIG. 12A at a later time. The user 630 is moving away from the sound object 620$_1$.

The method classifies sound objects, within a rendered virtual space, as a first class of sound object (sound object 620$_1$) or a second class of sound object (the other sound objects 620) in dependence upon historic action of a user 630 within the virtual space 600 (the activation action performed previously at FIG. 12A).

The sound objects 620 that have been classified as the second class are rendered according to at least second rules and a current position of the user within the virtual space. These sound objects may be rendered as recorded so that they reproduce accurately the recorded sound space.

The sound object 620$_1$ that has been classified as the first class is rendered according to first rules within the virtual space.

The first rules may be defined by one or more rules. The second rules may be defined by one or more rules. In some but not necessarily all examples, the user is able to program at least partially the first rules. In some but not necessarily all examples, the user is able to program at least partially the second rules.

The first rules can be used to improve user perception of the sound object 620$_1$ of the first class. They may for example make the sound object 620$_1$ of the first class easier to hear relative to a similar sound object of the second class at a similar position/distance. They may for example make the sound object 620$_1$ of the first class easier to hear compared to the same sound object when of the second class.

The first rules may, for example, provide perceptual persistence of the sound object 620$_1$ of the first class despite the increasing separation in the virtual space 610 of the user 630 and the sound object 620$_1$ of the first class. 'Hearability' of the sound object 620$_1$ of the first class is augmented compared to what it should be according to the laws of physics and artificially maintained relative to what it should be. This allows the user 630 to move around the virtual space 600 and still hear the sound object 620$_1$ of the first class.

In some but not necessarily all examples, the sound object 620$_1$ of the first class is rendered according to at least first rules within the virtual space 600 and also a current position of the user. In these examples, the rendering of the sound object 620$_1$ of the first class is user-interactive depending upon a current (real-time) position of the user 630.

As an example, in some but not all examples, each of the one or more sound objects 620 are rendered with a class-based dependency based on a relative distance D of the sound object 620 to a user 630. For example, the sound objects of the second class are rendered with physical realism and are rendered with an intensity that has an inverse square law relationship to the relative distance D of the sound object to the user 630 ($I=k_1 D^{-2}$), whereas the sound object of the first class is rendered without physical realism and is rendered with an intensity that has a different relationship to the relative distance D of the sound object to the user 630 (e.g. $I=k_2 D^{-n}$, where $0 \le n < 2$, for example n=1, or ½. The sound objects of the first class are less dependent upon changes to real-time current relative position of the user and sound object.

The first rules can therefore define a first relationship between a variation in intensity of a rendered sound object 620 and a variation in distance D between the sound object and the user 630 in the virtual space 600 and the second rules can define a second different relationship between a variation in intensity of a rendered sound object 620 and a variation in distance D between the sound object and the user 630 in the virtual space 600.

Figure 12C:
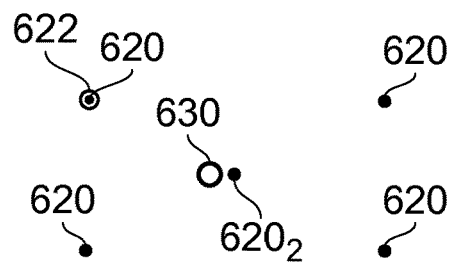

FIG. 12C illustrates the virtual space 600 of FIG. 12B at a later time. The user 630 has moved further away from the sound object 620$_1$ and is close to a different sound object 620$_2$.

As the user is next to the different sound object 620$_2$ of the second class, the user 630 can clearly hear that sound object 620$_2$. The user 630 is far from the other sound objects 620 of the second class and also the sound object 620$_1$ of the first class. However, the rendering of the sound object 620$_1$ of the first class is according to first rules whereas the rendering of the other sound objects 620 of the second class is according to second rules. This improves the user's ability to hear the sound object 620$_1$ of the first class. The user is therefore able to simultaneously listen to the nearby sound object 620$_2$ and the far away sound object 620$_1$ of the first class.

The method 500 gives the user 630 in the virtual space bionic or assisted hearing that allows them to hear the sound object $620_1$ of the first class when that would no longer be possible or would be difficult in real life.

In FIG. 12C, the user 630 performs an 'activation' action within the virtual space 600 in relation to the sound object $620_2$. This activation action is sufficient to cause a change in state of the sound object $620_2$ and its re-classification from the second class to the first class.

Figure 12D:
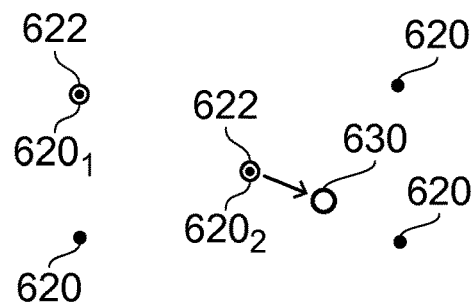

In FIG. 12D an indication 622 is used to identify that the sound object $620_2$ as a sound object of the first class. This indication may be a computer-generated virtual object 28. However, in other examples, an indication 622 is not used.

FIG. 12D illustrates the virtual space 600 of FIG. 12C at a later time. The user 630 is moving away from the sound object $620_2$.

The method classifies sound objects, within a rendered virtual space 600, as a first class of sound object (sound objects $620_1$, $620_2$) or a second class of sound object (the other sound objects 620) in dependence upon historic action of a user within the virtual space (the activation actions performed previously at FIG. 12A and FIG. 12C).

The sound objects 620 that have been classified as the second class are rendered according to at least second rules and a current position of the user 630 within the virtual space 600. Theses sound objects may be rendered as recorded so that they reproduce accurately the recorded sound space.

The sound objects $620_1$, $620_2$ that have been classified as the first class are rendered within the virtual space 600, according to first rules.

In some but not necessarily all examples, the user is able to program at least partially different first rules for the different sound objects $620_1$, $620_2$ of the first class. In other examples, the same first rules, which may or may not be partially programmed by the user, are used for all sound objects $620_1$, $620_2$ of the first class.

The first rules can be used to improve user perception of the sound objects $620_1$, $620_2$ of the first class as previously described with reference to FIG. 12B. They may for example make the sound objects $620_1$, $620_2$ of the first class easier to hear relative to a similar sound object of the second class at a similar position/distance. They may for example make the sound object $620_1$, $620_2$ of the first class easier to hear compared to the same sound object when of the second class.

The second rules may, for example, provide perceptual persistence of the sound object $620_1$, $620_2$ of the first class despite the increasing separation in the virtual space 600 of the user 630 and the sound object $620_1$, $620_2$ of the first class. The 'hearability' of the sound object $620_1$, $620_2$ of the first class is augmented compared to what it should be according to the laws of physics and artificially maintained relative to what it should be. This allows the user 630 to move around the virtual space 600 and still hear the sound object $620_1$, $620_2$ of the first class.

In some but not necessarily all examples, the sound object $620_1$, $620_2$ of the first class is rendered according to at least first rules within the virtual space and a current position of the user as previously described with reference to FIG. 12B.

Figure 12E:
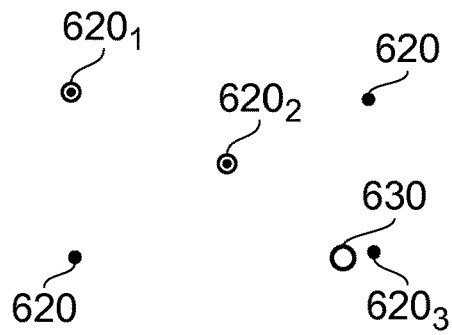

FIG. 12E illustrates the virtual space 600 of FIG. 12D at a later time. The user 630 has moved further away from the sound object $620_2$ and is close to a different sound object $620_3$.

As the user is next to the different sound object $620_3$ of the second class, the user 630 can clearly hear that sound object $620_3$. The user is far from the other sound objects 620 of the second class and also the sound object $620_2$ of the first class. The user is very far from the sound object $620_1$ of the first class. However, the rendering of the sound objects $620_1$ and $620_2$ of the first class is according to first rules whereas the rendering of the other sound objects 620 of the second class is according to second rules. This improves the user's ability to hear the sound objects $620_1$ $620_2$ of the first class. The user is therefore able to simultaneously listen to the nearby sound object $620_3$ and the far away sound object $620_2$ of the first class and the very far away sound object $620_1$ of the first class.

The method 500 gives the user 630 in the virtual space 600 bionic or assisted hearing that allows them to hear the sound objects $620_1$, $620_2$ of the first class simultaneously when that would no longer be possible or would be difficult in real life.

The method 500 may additionally allow the user 630 to distinguish between the sound objects $620_1$ $620_2$ of the first class. In the example of FIG. 12E, the sound objects $620_1$ $620_2$ of the first class are not spatially diversified (they are in a line relative to the user) and it may be difficult for a user to separate the sound objects $620_1$ $620_2$ of the first class as they are rendered according to their true direction (bearing) in the virtual space 600.

The first rules may therefore cause one or more of the sound objects $620_1$ $620_2$ of the first class to be rendered with a modified positional property and/or frequency property (diverse spatial and/or frequency channels). The first rules may, for example, prevent redundancy (double occupancy) of a positional channel (direction/bearing) by more than one sound object $620_1$ $620_2$ of the first class. In addition or alternatively, the first rules may, for example, prevent redundancy (double occupancy) of a frequency channel (critical band) by more than one sound object $620_1$ $620_2$ of the first class.

In FIG. 12E, the user 630 does not perform an 'activation' action within the virtual space 600 in relation to the sound object $620_3$. In FIG. 12E there is no indication 622 for the sound object $620_3$ as a sound object of the first class.

Figure 12F:
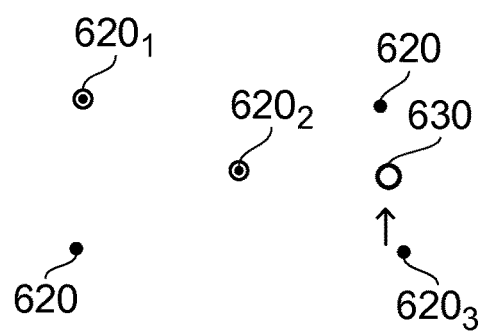

FIG. 12F illustrates the virtual space 600 of FIG. 12E at a later time. The user 630 has moved further away from the sound object $620_3$.

As the user 630 is further from the sound object $620_3$ of the second class, the user cannot clearly hear that sound object. The user is far from the other sound objects 620 of the second class and also the sound object $620_2$ of the first class. The user is very far from the sound object $620_1$ of the first class. However, the rendering of the sound objects $620_1$ and $620_2$ of the first class is according to first rules whereas the rendering of the other sound objects 620 of the second class is according to second rules. This improves the user's ability to hear the sound objects $620_1$ $620_2$ of the first class. The user is therefore able to simultaneously listen to the far away sound object $620_2$ of the first class and the very far away sound object $620_1$ of the first class.

Figure 13:
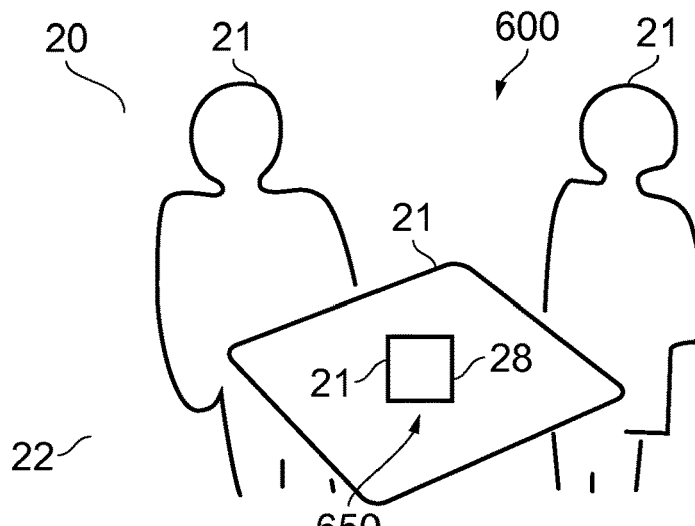
FIG. 13 illustrates one example of an 'activation' action performed within the virtual space by a user for change a classification of a sound object to the first class.

FIG. 13 illustrates one example of an 'activation' action performed within the virtual space 600 by the user 630. The user is exploring the virtual space 600 using first person perspective-mediated, user interactive-mediated mediated reality while listening to the rendered sound objects 620 as spatially rendered audio. The mediated reality may be virtual reality or augmented reality. The user is able to view the virtual visual scene 22 of the virtual visual space 20 and simultaneously hear the corresponding sound scene of the corresponding sound space 610.

The Fig illustrates a virtual visual scene 22 of the virtual space 600 (virtual visual space 20) viewed by a user from a user-perspective.

The virtual visual scene 22 comprises a plurality of virtual objects 21. In this example the virtual objects 21 represent two people in conversation at a table.

The conversation has existence in the sound space 610 as a sound object 620 at a particular position in the sound space 610 corresponding with the position of the table in the corresponding virtual visual space 20.

In this example, but not necessarily all examples, the conversation sound object 620 is visually represented in the virtual visual space 20 using a computer-generated virtual object 28.

The user may activate the conversation sound object 620 by interacting with the visual representation 650 of the conversation sound object 620.

When the conversation sound object 620 is activated this may be indicated as described with reference to FIGS. 12B and 12D, for example.

The activation may be implied (automatic) by for example looking at the representation 650 or being near the representation 650 for a minimum threshold period of time. A gesture such as a head nod may be required to confirm the implied activation or a gesture such as a head shake may be required to cancel the implied activation.

The activation may be explicit (manual) by for example directly interacting with the representation 650 by, for example, the user 630 performing a gesture relative to the representation 650 in the virtual space 600 or by the user 630 touching the representation 650 in the virtual space 600.

Figure 14:
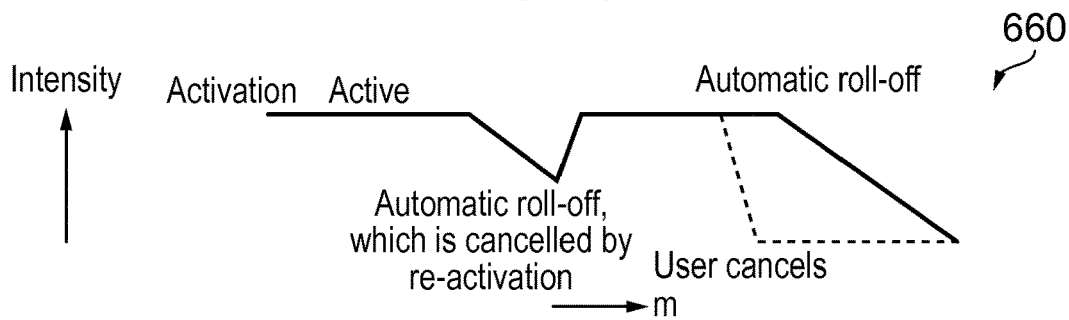
FIG. 14 illustrates an example of how first rules may be used to control rendering of a sound object of the first class.

FIG. 14 illustrates an example of how first rules are used in this illustrated example to control rendering of a sound object 620 of the first class.

In this example one or more properties of the sound object as recorded is adapted when the sound object is rendered. The adaptation is dependent upon a metric value m accumulated since the rendering of the sound object started according to the first rules. The metric m measures a value accumulated since the sound object was classified as a sound object of the first class.

The property or properties of the sound object are plotted along the y-axis of a plot in FIG. 14 and the metric m is plotted as the x-axis.

The metric m may, for example, be a time that has elapsed or a distance travelled by a user.

The specific example illustrated, plots intensity (power per unit area) of the sound object against time.

In this example the intensity of the sound object of the first class when first activated (or re-activated) has a fixed, constant value that does not vary with time. After a threshold period of time, the intensity of the sound object of the first class decreases linearly with time (for example to zero, or a physically realistic value) unless the sound object 620 is re-activated by a user 630 or the user 630 cancels the activation.

Figure 15:
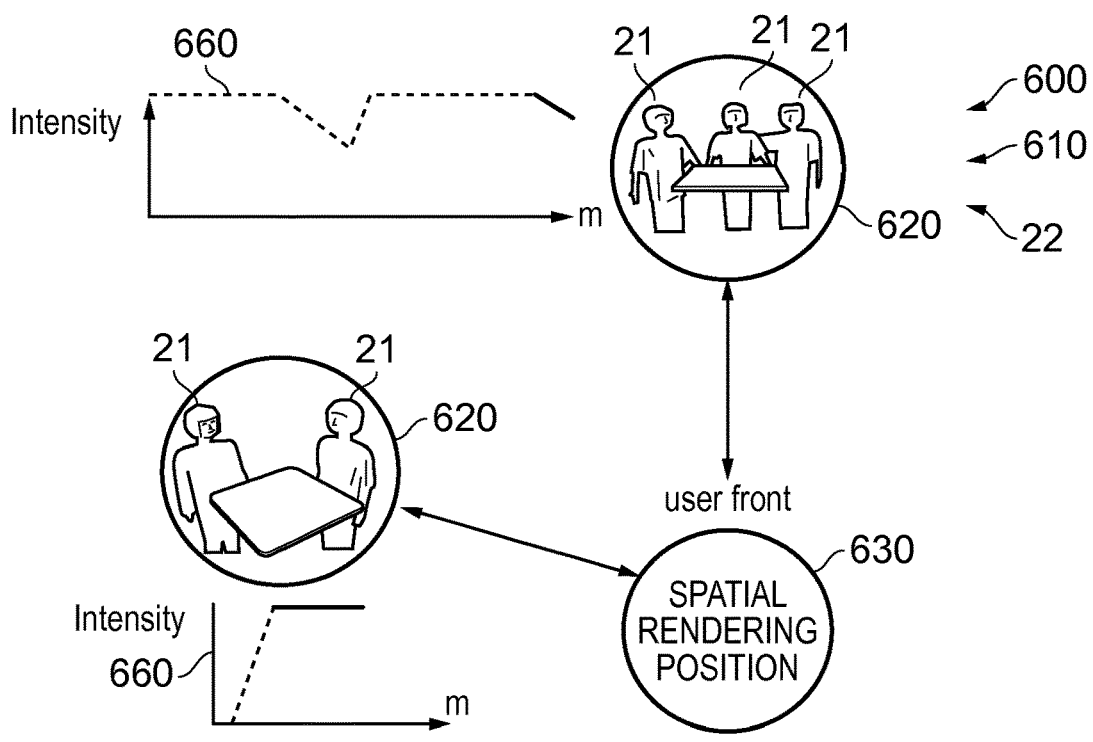
FIG. 15 illustrates an example of how first rules may be used to control simultaneous rendering of multiple sound objects of the first class.

FIG. 15 illustrates an example of how first rules can be used in this example to control rendering of multiple sound objects 620 of the first class.

In this example one or more properties of particular sound objects as recorded are adapted when the particular sound objects are rendered. The adaptation of a property for a particular sound object is dependent upon a metric value m accumulated since the rendering of that particular sound object started according to the first rules. The metric m measures a value accumulated since that particular sound object was classified as a sound object of the first class.

The metric m may, for example, be a time that has elapsed or a distance travelled by a user 630 in the virtual space 600.

The specific example illustrates a plot, for each sound object of the first class, of intensity of the sound object against time.

In this example the intensity of the sound object of the first class when first activated (or re-activated) has a fixed, constant value that does not vary with time. After a threshold period of time, the intensity of the sound object of the first class decreases linearly with time to zero or a physically realistic value unless that sound object is re-activated by a user or the user cancels the activation.

In this example, the two sound objects of the first class have been activated at different times.

The sound object at the top of the figure, has been classified as a sound source of the first class for a long time. The user has already re-activated the sound object. It is now fading away again and will revert to a sound object of the second class unless the user re-activates it.

The sound object at the bottom left of the figure, has just been classified as a sound object of the first class.

Figure 16A:
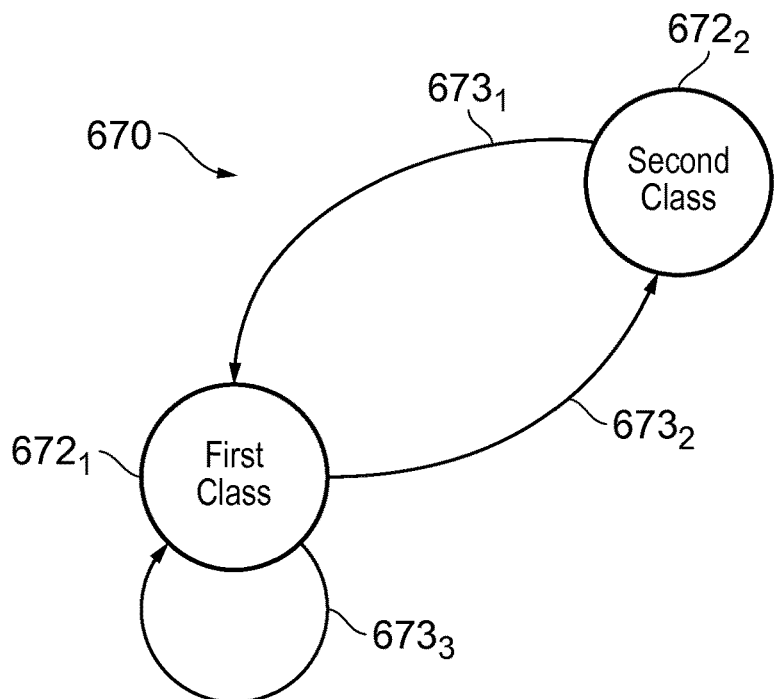
FIG. 16A illustrates the effect of an example of the method of FIG. 11 as a state diagram.

FIG. 16A illustrates the effect of the method 500 as a state diagram for a sound object 620. In this example, the sound object 620 may be in either of two states 672 and state transitions 673 cause a transition between states. One state, a first state, $672_1$ is the state for a sound object of the first class. The first rules control rendering of the sound object when it is in the first state $672_1$ The other state, a second state $672_2$, is for a sound object of the second class. The second rules control rendering of the sound object when it is in the second state $672_2$.

The step of classifying the sound objects may cause a state transition $673_1$ from the second state $672_2$ to the first state $672_1$ if the sound object is classified as a sound object of the first class.

The re-classifying of the sound object may cause a state transition $673_2$ from the first state $672_1$ to the second state $672_2$ if the sound object is re-classified as a sound object of the second class. This may occur, for example, because the first state $672_1$ is a temporary state that expires unless re-activated by a user, for example, as described with reference to FIGS. 14, 15. The reactivation of the first state $672_1$ is illustrated by state transition $673_3$ which re-starts the first state $672_1$.

When a trigger event happens, a state transition 673 occurs. A trigger event happens when one or more trigger condition(s) are satisfied.

The first state $672_1$ is a persistent state. The state lasts after the trigger event occurs.

A further trigger event is required to exit the first state $672_1$. This further trigger event may happen automatically in some examples, causing the first state $672_1$ to be temporary for example ending $673_2$ after a predetermined condition (e.g. the metric value m exceeds a threshold) is satisfied unless renewed (reactivated) $673_3$.

When a trigger event/trigger condition(s) cause a state transition to the first state $673_1$ from the second state $672_2$, it is based on historic action of the user.

Figure 16B:
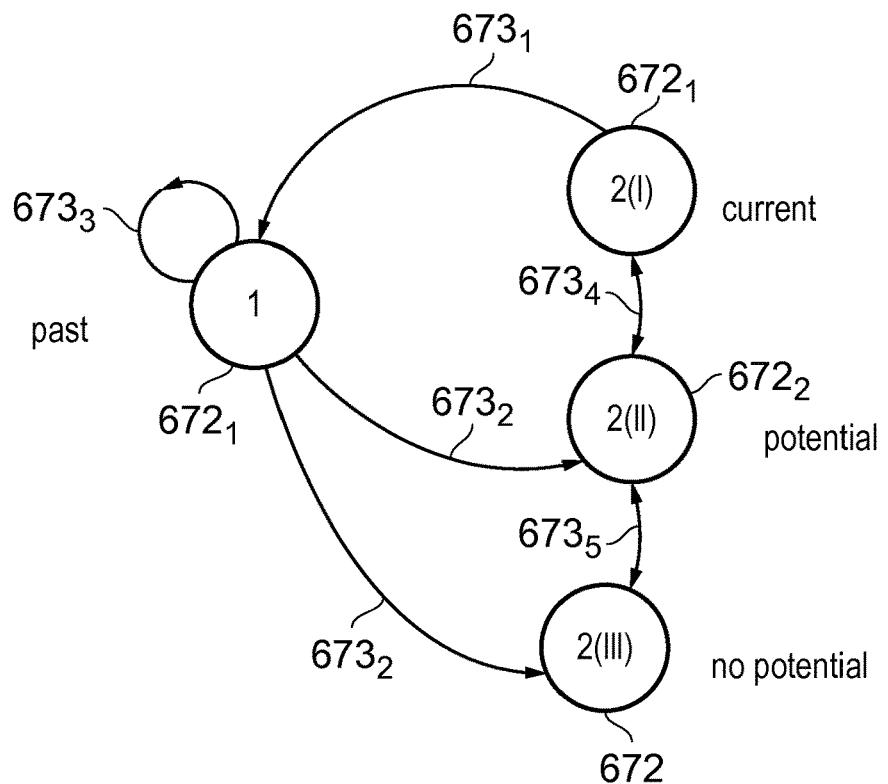
FIG. 16B illustrates the effect of another example the method of FIG. 11 as a state diagram.

FIG. 16B illustrates the effect of the method 500 as a state diagram similar to FIG. 16A. However, in this example, the second state $672_2$, is represented by multiple sub states.

In this example, if the sound object 620 is in the second state it will be in one of the multiple sub states 2(i), 2(ii), 2(iii).

Any of the multiple sub states may be a state for a sound object of the second class. The second rules control rendering of the sound object when it is in a sub state of the second state $672_2$.

The step of classifying the sound objects may cause a state transition $673_1$ from a sub state $2(i)$ of the second state $672_2$ to the first state $672_1$ if the sound object is classified as a sound object of the first class.

The re-classifying of the sound objects may cause a state transition $673_2$ from the first state $672_1$ to one of the sub states of the second state $672_2$ if the sound object is re-classified as a sound object of the second class. This may occur, for example, because the first state $672_1$ is a temporary state that expires unless re-activated by a user, for example, as described with reference to FIGS. 14, 15. The reactivation of the first state is illustrated by state transition $673_3$ which re-starts the first state $672_1$.

When a trigger event happens a state transition 673 occurs. A trigger event happens when one or more trigger condition(s) are satisfied. The first state $672_1$ is a persistent state. The state lasts after the trigger event occurs.

A further trigger event is required to exit the first state $672_1$. This further trigger event may happen automatically in some examples, causing the first state $672_1$ to be temporary for example ending $673_2$ after a predetermined condition (e.g. the metric value m exceeds a threshold) is satisfied unless renewed (reactivated) $673_3$.

When a trigger event/trigger condition(s) cause a state transition to the first state $673_1$ from one of the sub states of the second state $672_2$, it is based on historic action of the user.

A first sub state $2(i)$ of the second state is entered when the sound object 620 is in the second state $672_2$ and there is current interaction between the sound object 620 and the user 630. It is possible to transition $673_1$ from this state to the first state $672_1$, for example, if the current interaction causes an activation.

A second sub state $2(ii)$ of the second state $672_2$ is entered when the sound object 620 is in the second state $672_2$ and there is potential for interaction between the sound object 620 and the user 630 (but no current interaction between the sound object and the user). In this example, it is not possible to transition from this sub state $2(ii)$ to the first state $672_1$ but it may be possible for other state diagrams. It is possible to transition $673_2$ to this state from the first state $672_1$. It is possible to transition $673_4$ to/from the first sub state $2(i)$ of the second state $672_2$.

A third sub state $2(iii)$ of the second state $672_2$ is entered when the sound object 620 is in the second state $672_2$ and there is no potential for interaction between the sound object 620 and the user 630 (no current interaction between the sound object and the user and no potential for current interaction between the sound object and the user). In this example, it is not possible to transition from this sub state $2(iii)$ to the first state $672_1$ but it may be possible for other state diagrams. It is possible to transition $673_2$ to this sub state $2(iii)$ from the first state $672_1$. It is possible to transition $673_5$ to/from the second sub state $2(ii)$ of the second state $672_2$.

The sound objects 620 in the sub states $2(n)$ of the second state $672_2$ (those of the second class) are rendered differently to the sound objects 620 in the first state $672_1$ (those of the first class).

The different sound objects 620 in each of the sub states $2(n)$ of the second state $672_2$ are rendered differently to the sound objects 620 in the other sub states $2(m)$ of the second state $672_2$ but in the same way as sound objects 620 in the same sub state $2(n)$ of the second state $672_2$.

For example, the sound objects 620 in the first sub state $2(i)$ of the second state $672_2$ may be rendered as recorded.

For example, the sound objects 620 in the second sub state $2(ii)$ of the second state $672_2$ may be rendered to emphasis the sound objects 620 but only when the user 630 is directly facing a position of the sound object 620 in the virtual space 600.

For example, the sound objects 620 in the third sub state $2(iii)$ of the second state $672_2$ may be rendered to de-emphasize the sound objects 620.

The emphasis/de-emphasis of a sound object 620 may be achieved by modifying a property of the sound object 620.

For example, emphasis may be achieved by using distinct spatial and/or frequency channels and/or increasing intensity.

For example, de-emphasis may be achieved by using shared spatial and/or spectral channels, decreasing intensity and using reverberations to emulate background chatter.

In one use case, a user attends a cocktail party in virtual space 600 using mediated reality. It may be virtual reality or augmented reality. He listens via spatial audio to a conversation at a first table (A). By for example gazing at or being proximal to a computer-generated virtual object representing the sound object 620 of the conversation for a threshold time, the user activates the sound object 620. The computer-generated virtual object 28 changes appearance indicating 622 that it has been activated. The user 630 may confirm the activation with a nod of the head or cancel the activation with a shake of the head. The user 630 may be able to perform gestures to program attributes of the first rules. The sound object 620 following activation enters the first state (classified as first class) and the user 630 is then able to listen to the sound object 620, the conversation from table A, while the user 630 moves away from table A and even while the user listens to a conversation at another table, table B.

In the foregoing examples, reference has been made to a computer program or computer programs. A computer program, for example either of the computer programs 48, 416 or a combination of the computer programs 48, 416 may be configured to perform the method 500.

Also as an example, an apparatus 30, 400 may comprises:

at least one processor 40, 412; and at least one memory 46, 414 including computer program code the at least one memory 46, 414 and the computer program code configured to, with the at least one processor 40, 412, cause the apparatus 430, 00 at least to perform:

causing classification of sound objects, within a rendered virtual space, as a first class of sound object or a second class of sound object in dependence upon historic action of a user within the virtual space;

rendering one or more sound objects of the first class according to at least first rules; and rendering one or more sound objects of the second class according to at least second rules, different to the first rules, and a current position of the user within the virtual space.

The computer program 48, 416 may arrive at the apparatus 30,400 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 48, 416. The delivery mechanism may be a signal configured to reliably transfer the computer program 48, 416. The apparatus 30, 400 may propagate or transmit the computer program 48, 416 as a computer data signal. FIG. 10 illustrates a delivery mechanism 430 for a computer program 416.

It will be appreciated from the foregoing that the various methods 500 described may be performed by an apparatus 30, 400, for example an electronic apparatus 30, 400.

The electronic apparatus 400 may in some examples be a part of an audio output device 300 such as a head-mounted audio output device or a module for such an audio output device 300. The electronic apparatus 400 may in some examples additionally or alternatively be a part of a head-mounted apparatus 33 comprising the display 32 that displays images to a user.

In some examples, the placement of the head-mounted apparatus 33 onto the head of a user may cause the system to perform or to be able to perform the method 500 illustrated in FIG. 11. That is, while the head-mounted apparatus 33 is not placed on a head of a user, the method 500 is not operational. When the head-mounted apparatus is placed on a head of a user, the method 500 becomes operational enabling control of a sound scene using first perspective, user-interactive, mediated reality (virtual reality or augmented reality).

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks, steps and processes illustrated in the FIGS. 11-16B may represent steps in a method and/or sections of code in the computer program. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. The controller 42 or controller 410 may, for example be a module. The apparatus may be a module. The display 32 may be a module.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
at least one processor; and
at least one non-transitory memory including computer program code, the at least one memory and the computer program code configured to, with the at least one processor, cause the apparatus to perform at least the following:
cause classification of sound objects, within a rendered virtual space, as a first class of sound object or a second class of sound object in dependence upon historic action of a user within the rendered virtual space, wherein the historic action comprises an interaction associated with one or more of the sound objects, and wherein the interaction comprises at least one of:
proximity of the user to at least one visual representation of the one or more sound objects for a minimum period of time, or
performance by the user of a gesture with respect to the at least one visual representation of the one or more sound objects;
render one or more of the sound objects of the first class according to at least first rules; and
render one or more of the sound objects of the second class according to at least second rules, different to the first rules, and a current position of the user within the rendered virtual space.

2. An apparatus according to claim 1, wherein rendering of the one or more sound objects of the first class according to the first rules is configured to cause an augmented user perception of the one or more sound objects of the first class relative to at least one of:
a user perception of the one or more sound objects of the second class; and/or
a user perception of the one or more sound objects of the first class as recorded.

3. An apparatus according to claim 1, wherein rendering of the one or more sound objects of the first class according to the first rules is configured to provide perceptual persistence of the one or more sound objects of the first class where a separation in the rendered virtual space between the user and the one or more sound objects of the first class increases.

4. An apparatus according to claim 1, wherein rendering of the one or more sound objects of the first class is dependent, with a first dependency, on a first relative distance between the one or more sound objects of the first class and the user;
wherein rendering of the one or more sound objects of the second class is dependent, with a second dependency, different to the first dependency, on a second relative distance between the one or more sound objects of the second class and the user; and
wherein a sensitivity of the first dependency to real-time changes in the first relative distance is less than a sensitivity of the second dependency to real-time changes in the second relative distance.

5. An apparatus according to claim 1, wherein rendering of the one or more sound objects of the first class according to the first rules further comprises adapting at least one property of the one or more sound objects of the first class as recorded when rendering, wherein the adapting of the at least one property is dependent upon a metric value accumulated from a time at which the rendering of the one or more sound objects of the first class according to the first rules begins.

6. An apparatus according to claim 1, wherein rendering of the one or more sound objects of the first class according to the first rules, comprises adapting at least one property of a sound object, as recorded, when the sound object is rendered.

7. An apparatus according to claim 1, wherein differences between the first rules and the second rules, cause a relative shift in one or more sound property values between the one or more sound objects of the first class and the one or more sound objects of the second class.

8. An apparatus according to claim 1, wherein the first rules define a first relationship between a variation in intensity of a rendered sound object and a variation in distance between the rendered sound object and the user in the rendered virtual space and wherein the second rules define a second relationship between a variation in intensity of a rendered sound object and a variation in distance between the rendered sound object and the user in the rendered virtual space.

9. An apparatus according to claim 1, wherein the at least one memory and the computer program code are configured to, with the at least one processor, further cause the apparatus to perform at least the following:
cause rendering of multiple sound objects of the one or more sound objects of the first class, according to common first rules within the rendered virtual space, in diverse spatial and/or frequency channels.

10. An apparatus according to claim 1, wherein the at least one memory and the computer program code are configured to, with the at least one processor, further cause the apparatus to perform at least the following:
cause classification of a first sound object, within the rendered virtual space, as a sound object of the first class of sound object in dependence upon historic interaction between the first sound object and the user; and
cause classification of a second sound object, within the rendered virtual space, as a sound object of a sub-class of the second class of sound object in dependence upon:
a current interaction between the second sound object and the user; or
a determination that no interaction between the second sound object and the user is possible; or
a determination that an interaction between the second sound object and the user is possible; and
render one or more sound objects of the sub-class of the second class according to rules dependent upon the sub-class.

11. An apparatus according to claim 1, wherein the at least one memory and the computer program code are configured to, with the at least one processor, further cause the apparatus to perform at least the following:
cause classification of a sound object as a sound object of the first class of sound object, where the classification comprises triggering a change to a persistent state in dependence upon a trigger event being satisfied with the historic action of the user, wherein the state has persistence after the trigger event ends.

12. An apparatus according to claim 11, wherein the persistent state is temporary ending after a predetermined condition is satisfied unless renewed.

13. An apparatus according to claim 1, wherein the user is viewing the rendered virtual space via a user-perspective mediated reality while listening to the rendered one or more sound objects of the first class and the second class as spatially rendered audio.

14. A method comprising:
causing classification of sound objects, within a rendered virtual space, as a first class of sound object or a second class of sound object in dependence upon historic action of a user within the rendered virtual space, wherein the historic action comprises an interaction associated with one or more of the sound objects, and wherein the interaction comprises at least one of:

proximity of the user to at least one visual representation of the one or more sound objects for a minimum period of time, or performance by the user of a gesture with respect to the at least one visual representation of the one or more sound objects;

rendering one or more of the sound objects of the first class according to at least first rules; and rendering one or more of the sound objects of the second class according to at least second rules, different to the first rules, and a current position of the user within the rendered virtual space.

15. A method as claimed in claim 14, wherein the rendering of the one or more sound objects of the first class according to the first rules is configured to augment user perception of the one or more sound objects of the first class relative to at least one of:

a user perception of the one or more sound objects of the second class; and/or a user perception of the one or more sound objects of the first class as recorded.

16. A method as claimed in claim 14, wherein the rendering of the one or more sound objects of the first class according to the first rules is configured to provide perceptual persistence of the one or more sound objects of the first class where a separation in the rendered virtual space between the user and the one or more sound objects of the first class increases.

17. A method as claimed in claim 14, wherein the rendering of the one or more sound objects of the first class is dependent, with a first dependency, on a first relative distance between the one or more sound objects of the first class and the user;

wherein rendering of the one or more sound objects of the second class is dependent, with a second dependency, different to the first dependency, on a second relative distance between the one or more sound objects of the second class and the user; and wherein a sensitivity of the first dependency to real-time changes in the first relative distance is less than a sensitivity of the second dependency to real-time changes in the second relative distance.

18. A method as claimed in claim 14, wherein the rendering of the one or more sound objects of the first class according to the first rules further comprises adapting at least one property of the one or more sound objects as recorded when rendering, wherein the adapting of the at least one property is dependent upon a metric value accumulated from a time at which the rendering of the one or more sound objects of the first class according to the first rules begins.

19. A non-transitory computer readable medium comprising program instructions stored thereon for performing at least the following:

cause classification of sound objects, within a rendered virtual space, as a first class of sound object or a second class of sound object in dependence upon historic action of a user within the rendered virtual space, wherein the historic action comprises an interaction associated with one or more of the sound objects, and wherein the interaction comprises at least one of:

proximity of the user to at least one visual representation of the one or more sound objects for a minimum period of time, or performance by the user of a gesture with respect to the at least one visual representation of the one or more sound objects;

render one or more of the sound objects of the first class according to at least first rules; and render one or more of the sound objects of the second class according to at least second rules, different to the first rules, and a current position of the user within the rendered virtual space.

* * * * *